United States Patent
Behring et al.

(10) Patent No.: US 11,760,372 B2
(45) Date of Patent: Sep. 19, 2023

(54) METHOD AND CONTROL UNIT FOR DISPLAYING A TRAFFIC SITUATION BY HIDING TRAFFIC PARTICIPANT SYMBOLS

(71) Applicant: Bayerische Motoren Werke Aktiengesellschaft, Munich (DE)

(72) Inventors: Alexander Behring, Gilching (DE); Rolf Brenndoerfer, Wolfratshausen (DE); Stefanie Einwang, Munich (DE); Marc Mueller, Merklingen (DE); Dominik Schmoelz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 141 days.

(21) Appl. No.: 17/596,905

(22) PCT Filed: Jun. 4, 2020

(86) PCT No.: PCT/EP2020/065406
§ 371 (c)(1),
(2) Date: Dec. 21, 2021

(87) PCT Pub. No.: WO2021/001110
PCT Pub. Date: Jan. 7, 2021

(65) Prior Publication Data
US 2022/0315027 A1    Oct. 6, 2022

(30) Foreign Application Priority Data
Jul. 1, 2019    (DE) ................. 10 2019 117 689.1

(51) Int. Cl.
*B60W 50/14*    (2020.01)
*B60K 35/00*    (2006.01)

(52) U.S. Cl.
CPC ............ *B60W 50/14* (2013.01); *B60K 35/00* (2013.01); *B60K 2370/165* (2019.05);
(Continued)

(58) Field of Classification Search
CPC . B60W 50/14; B60W 2050/146; B60K 35/00; B60K 2370/165; B60K 2370/31;
(Continued)

(56) References Cited

U.S. PATENT DOCUMENTS

| 5,436,623 A | * | 7/1995 | Terada | G01C 21/3626 340/995.27 |
| 7,688,188 B2 | * | 3/2010 | Kume | G08G 1/162 340/995.13 |

(Continued)

FOREIGN PATENT DOCUMENTS

| DE | 10 2017 105 215 A1 | 10/2017 |
| DE | 11 2015 006 773 T5 | 4/2018 |

(Continued)

OTHER PUBLICATIONS

International Search Report (PCT/ISA/210) issued in PCT Application No. PCT/EP2020/065406 dated Oct. 12, 2020 with English translation (six (6) pages).

(Continued)

*Primary Examiner* — Chico A Foxx
(74) *Attorney, Agent, or Firm* — Crowell & Moring LLP

(57) ABSTRACT

A control unit for displaying a traffic situation on a screen of an ego vehicle is designed to display a first traffic participant symbol for a first traffic participant in a first sub-region of the screen and a second traffic participant symbol for a second traffic participant in a second sub-region of the screen. The control unit is additionally designed to determine that the first traffic participant symbol and the second traffic participant symbol are approaching each other in a specified manner on the basis of a change in the position of the second traffic participant relative to the first traffic (Continued)

participant. In response thereto, the control unit is further designed to at least partly hide the first and/or the second traffic participant symbol.

19 Claims, 7 Drawing Sheets

(52) U.S. Cl.
CPC .. *B60K 2370/178* (2019.05); *B60K 2370/179* (2019.05); *B60K 2370/1868* (2019.05); *B60K 2370/193* (2019.05); *B60K 2370/31* (2019.05); *B60W 2050/146* (2013.01)

(58) Field of Classification Search
CPC ........ B60K 2370/178; B60K 2370/193; B60K 2370/1868; B60K 2370/179
See application file for complete search history.

(56) References Cited

U.S. PATENT DOCUMENTS

| | | | |
|---|---|---|---|
| 2010/0253494 A1* | 10/2010 | Inoue | G02B 27/01 340/436 |
| 2013/0271606 A1 | 10/2013 | Chiang | |
| 2013/0335618 A1* | 12/2013 | Sugawara | G06F 3/04847 348/349 |
| 2014/0226015 A1* | 8/2014 | Takatsudo | H04N 7/18 348/148 |
| 2016/0042642 A1* | 2/2016 | Yamashiro | G08G 1/137 340/990 |
| 2017/0287186 A1 | 10/2017 | Saito et al. | |
| 2018/0090002 A1 | 3/2018 | Arita et al. | |
| 2018/0201192 A1* | 7/2018 | Ishida | B60R 1/08 |
| 2019/0116315 A1* | 4/2019 | Satomi | H04N 23/61 |
| 2019/0347879 A1 | 11/2019 | Motomura et al. | |
| 2019/0361442 A1 | 11/2019 | Izaki et al. | |
| 2021/0031758 A1* | 2/2021 | Urano | B60W 30/0956 |
| 2021/0046822 A1* | 2/2021 | Kleen | B60R 1/00 |
| 2022/0107497 A1* | 4/2022 | Murata | G01C 21/365 |

FOREIGN PATENT DOCUMENTS

| | | |
|---|---|---|
| FR | 3 056 805 A1 | 3/2018 |
| GB | 2563902 A | 1/2019 |
| WO | WO 2018/150580 A1 | 8/2018 |
| WO | WO 2018/155327 A1 | 8/2018 |

OTHER PUBLICATIONS

Japanese-language Written Opinion (PCT/ISA/237) issued in PCT Application No. PCT/EP2020/065406 dated Oct. 12, 2020 (six (6) pages).

German-language Search Report issued in German Application No. 10 2019 117 689.1 dated Mar. 23, 2020 with partial English translation (12 pages).

\* cited by examiner

METHOD AND CONTROL UNIT FOR DISPLAYING A TRAFFIC SITUATION BY HIDING TRAFFIC PARTICIPANT SYMBOLS

BACKGROUND AND SUMMARY OF THE INVENTION

The invention relates to the provision of image information in relation to the surroundings and/or the state of a vehicle on a screen of a vehicle, in particular a motor vehicle. The screen may also comprise or be a head-up display or the projection surface of a projector.

A vehicle may comprise one or more driver assistance systems that assist a driver of the vehicle with the longitudinal and/or transverse guidance of the vehicle. The vehicle may furthermore have a screen on which information in relation to the surroundings and/or the state of the vehicle is depicted in order to assist with the longitudinal and/or transverse guidance of the vehicle. By way of example, other road users in the immediate vicinity of the vehicle may be depicted on the screen in order to assist the driver of the vehicle with a turning procedure or with a lane change.

Outputting image information on a screen of a vehicle may lead to the vehicle driver being distracted and/or irritated, which reduces the assistive effect of the output and which possibly reduces the safety of the vehicle. The present document deals with the technical problem of allowing image information to be output in a vehicle, this image information assisting the driver of the vehicle with the longitudinal and/or transverse guidance of the vehicle in a reliable and safe manner.

The problem is solved in each case by the claimed invention.

A description is given below of various aspects of a control unit of an ego vehicle, which control unit is designed to depict an image, in particular an image of the surroundings in relation to a traffic situation in the surroundings of the ego vehicle, on a screen of the ego vehicle. The described aspects may be combined with one another as desired.

It is pointed out that the control unit possibly comprises multiple different controllers and/or control modules of the vehicle. By way of example, image data to be output on a screen may be generated by a first controller or by a first control module. A (longitudinal and/or transverse guidance) actuator of the ego vehicle may furthermore be controlled by one or more further controllers or control modules. The control unit described in this document may comprise the first controller or control modules and possibly the one or more further controllers or control modules.

The traffic situation in the surroundings of the ego vehicle may be acquired on the basis of the surroundings data from one or more surroundings sensors (for example a radar sensor, an image sensor, a lidar sensor, an ultrasound sensor, etc.) of the ego vehicle. The information reproduced in the image (for example the road user symbols depicted for one or more road users or symbols for short) may in particular be ascertained on the basis of the surroundings data and/or on the basis of state data in relation to the state of the vehicle.

The control unit, described in this document, for an ego vehicle may be designed to reproduce the state of a driving function of the ego vehicle on the screen of the ego vehicle. By way of example, it may be displayed whether or not a driving function (for example ACC or a lane keep assistant or a lane change assistant) is activated. Information in relation to a parameter (for example in relation to a set distance in the case of ACC) may also be displayed. The information in relation to a driving function may for example be depicted through color coding of the displayed road user symbols and/or of the displayed lanes. By way of example, the symbol for a reference vehicle for ACC may be identified through a particular color. In a further example, a vehicle critical for a lane change, that is to say the symbol for this vehicle, may be highlighted on another lane by a particular color.

A description is thus given of a control unit for depicting a traffic situation on a screen of an ego vehicle. The traffic situation may be reproduced in a series or sequence of images on the screen. In this case, each image may display one or more road user symbols that represent one or more corresponding road users in the surroundings of the ego vehicle and/or the ego vehicle itself. Examples of road users are motor vehicles, such as automobiles, trucks, motorcycles, buses, etc. A road user symbol may be a predefined icon or pictogram. The one or more road users may thus be depicted on the screen of the ego vehicle in abstract form. The road being driven on by the ego vehicle may furthermore also be reproduced in an abstract manner by one or more symbolically displayed lanes on the screen. It is thus possible to provide an effective and efficient depiction of the traffic situation in the surroundings of the ego vehicle that is able to be understood easily and quickly by the driver of the ego vehicle. Providing the depicted traffic situation in abstract form furthermore makes it possible to avoid the driver of the ego vehicle having to divert his attention excessively from the actual surroundings of the ego vehicle. This thus allows safe operation of the ego vehicle.

The control unit may be designed to depict a road user symbol for a road user driving in an actual lane at a constant first lateral position within a lane displayed on the screen. In this case, an "actual lane" denotes the lane of the road being driven on by the ego vehicle. On the other hand, a "displayed lane" denotes a lane depicted on the screen (in abstract form).

The control unit may in particular be designed, on the basis of the surroundings data, to identify one or more (actual) lanes of the road on which the ego vehicle is driving. It is furthermore possible to detect one or more road users. It is furthermore possible to ascertain how the one or more road users are positioned in relation to one another. It is in particular possible to ascertain, for a road user, the actual lane in which the road user is driving. Overall, it is possible to ascertain a surroundings model of the surroundings of the ego vehicle on the basis of the surroundings data.

The control unit may be designed to place the one or more road users, that is to say the corresponding one or more road user symbols for the one or more road users, on the screen. The ego vehicle (that is to say an ego symbol for the ego vehicle) may in this case for example be placed at a fixed position and/or in a defined region on the screen (for example in the middle and/or at a lower edge of the screen). The placement of the ego symbol may possibly vary within the limits of the fixedly defined region. The other road users in the surroundings of the ego vehicle (that is to say the road user symbols for the one or more other road users) and/or one or more symbols for one or more identified roads may then be placed on the screen in relation to the ego vehicle. The individual symbols may in this case be depicted in one or more displayed lanes on the screen (corresponding to the actual road users in one or more actual lanes).

The symbol for a road user (that is to say for a road user in the surroundings of the ego vehicle and/or for the ego vehicle itself) may in this case be depicted in a standard manner and/or permanently at a (fixed) first lateral position within a displayed lane. This may take place independently of the actual lateral position of the road user in the actual lane. The first lateral position is in this case preferably arranged centrally with respect to the displayed lane. It is thus possible, even in a complex traffic situation, to provide a stable and clear depiction of the traffic situation on the screen (thereby increasing the comfort and the safety of the ego vehicle).

The control unit may furthermore be designed to detect a lane event in relation to the road user departing the actual lane. The control unit may in particular be designed to detect a lane event whereby the road user (in particular the ego vehicle) has at least partially departed, will at least partially depart, could at least partially depart or should at least partially depart the actual lane. The lane event may be such that the lane event has a relatively high probability of causing a lane change of the road user (in particular the ego vehicle). As an alternative or in addition, the lane event may be linked to a lateral positioning of the road user (in particular the ego vehicle) within the actual lane and/or with transverse guidance of the road user (in particular the ego vehicle).

The lane event may for example comprise a warning from a lane keep assistant of the ego vehicle. As an alternative or in addition, the lane event may comprise a steering movement of a steering device (for example the steering wheel) of the ego vehicle, wherein the steering movement has an amplitude that is greater in terms of magnitude than a (predefined) amplitude threshold value. The steering movement may for example be brought about automatically by an actuator of the vehicle and/or manually through an intervention from the driver of the vehicle. As an alternative or in addition, the lane event may comprise an action by the driver of the ego vehicle in relation to a lane change, such as for example setting the indicator of the ego vehicle. As an alternative or in addition, the lane event may comprise a lane change initiated by a lane change assistant of the ego vehicle. As an alternative or in addition, the lane event may comprise a lane change of the ego vehicle that is initiated and/or suggested by an active navigation system of the ego vehicle. As an alternative or in addition, the lane event may comprise an indication or an intervention by an emergency lane assistant of the ego vehicle in order to form an emergency lane.

It is thus possible to detect a lane event as a result of which the driver of the ego vehicle typically expects a particular lateral positioning of a road user (in particular the ego vehicle) within a displayed lane (in particular the ego lane).

The control unit may be designed, in response to the detected lane event, to depict the road user symbol for the road user (in particular for the ego vehicle) at a second lateral position, deviating from the first lateral position, within the displayed lane. The second lateral position may in this case preferably be arranged at a right-hand or at a left-hand edge of the displayed lane. The road user symbol may in this case be depicted at the fixed and/or constant second lateral position for a particular duration, in particular independently of the actual lateral position of the road user on the actual lane. The road user symbol may possibly be depicted at the second lateral position until detection of an event that indicates that no lane change will be performed and/or until a particular predefined duration has elapsed. The road user symbol may thereafter be depicted back at the first lateral position.

It is thus possible to deviate selectively (possibly exclusively) from a fixed (and preferably central) lateral positioning of a road user symbol in the presence of a lane event. It is thus possible to provide a stable and consistent depiction of a traffic situation on the screen of the ego vehicle in order to increase the comfort and the safety of the ego vehicle.

The control unit may be designed, at a sequence of successive times, to depict the road user symbol at the first or at the second lateral position within the displayed lane independently of the actual lateral position of the road user within the actual lane. The control unit may in particular be designed to depict the road user symbol at the first lateral position within the displayed lane independently of an actual lateral position of the road user within the actual lane for as long as no lane event is detected. It is thus possible to provide a stable and clear depiction of a traffic situation that is able to be understood quickly by the driver of the ego vehicle.

The control unit may be designed to depict the road user symbol, apart from an animated transition to another displayed lane, exclusively at the first lateral position within the displayed lane when the road user is in the surroundings of the ego vehicle. The symbol for a road user in the surroundings of the ego vehicle may thus be displayed possibly exclusively at a single lateral position within a displayed lane (apart from an animated transition to another lane). It is thus possible to further improve the clarity of the depiction of a traffic situation.

The control unit may be designed to ascertain (on the basis of the surroundings data) position data in relation to an actual lateral position of a road user (in particular the ego vehicle) within an actual lane. The control unit may furthermore be designed, on the basis of the position data, to assign the road user symbol to a lateral position from a limited number of possible lateral positions within the displayed lane.

In this case, the limited number of possible lateral positions preferably contains only three possible lateral positions. The limited number of possible lateral positions may in particular comprise: a possible lateral position arranged at the left-hand edge of the displayed lane; a possible lateral position arranged centrally within the displayed lane; and/or a possible lateral position arranged at the right-hand edge of the displayed lane.

The control unit may be designed such that the road user symbol, apart from an animated transition from one possible lateral position to another possible lateral position, is depicted at each time only at exactly one of the possible lateral positions in the displayed lane.

Limiting the possible lateral positions within a displayed lane makes it possible to further improve the clarity of the depiction of a traffic situation.

As already explained above, the road user that is depicted at one of a few possible lateral positions within a displayed lane may be the ego vehicle, wherein the ego vehicle is driving in the actual ego lane. The road user symbol may then be the ego symbol for the ego vehicle that is depicted within the displayed ego lane. The ego lane and/or the ego symbol are preferably depicted centrally on the screen (in relation to the width of the screen). In this case, the ego symbol may in particular have a fixed unchangeable position on the screen. In the event of a change in the positioning of the ego vehicle, the one or more displayed lanes may be displaced. The depiction of the ego symbol at a fixed position allows the driver of the ego vehicle to quickly understand the traffic situation in the surroundings of the ego vehicle.

As already explained above, the control unit may be designed to bring about an animated transition of the road user symbol from the first lateral position to the second lateral position of the same displayed lane or to a particular lateral position of another lane. It is thus possible to further increase the clarity of the depiction of the traffic situation for a driver of the ego vehicle.

The control unit may be designed to depict another road user symbol for another road user in the surroundings of the ego vehicle that is driving in a first actual lane at the first lateral position in a corresponding first displayed lane. The control unit may furthermore be designed to detect that the other road user is changing to a second actual lane. In response thereto, it is possible to initiate the other road user symbol being depicted at the first lateral position in a corresponding second displayed lane on the screen. In this case, an animated transition from the first lateral position in the first displayed lane to the first lateral position in the second displayed lane may be implemented. The road user symbol of a road user from the surroundings of the ego vehicle may thus be moved in the event of a lane change from the first lateral position of the displayed starting lane to the first lateral position of the displayed target lane (in a sequence of images). It is thus possible to depict a lane change of a road user in the surroundings of the ego vehicle in an easily understandable manner, and this is able to be made understandable to the driver of the ego vehicle.

The control unit for depicting a traffic situation on a screen of an ego vehicle may be designed to divide the surroundings of the ego vehicle into one or more surroundings sectors. The one or more surroundings sectors may comprise at least one surroundings sector in the direction of travel of the ego vehicle in front of a front line of the ego vehicle. The front line may for example run perpendicular to the longitudinal axis of the ego vehicle and/or along the front of the ego vehicle. As an alternative or in addition, the one or more surroundings sectors may comprise at least one surroundings sector to the left and/or behind the ego vehicle, and/or at least one surroundings sector to the right and/or behind the ego vehicle.

In one preferred example, the one or more surroundings sectors comprise (preferably at most or exactly) the following five surroundings sectors:

A first surroundings sector that extends starting from the front line (to the rear) in a first adjacent lane to the left and possibly behind the ego vehicle. The first surroundings sector possibly exists only when a first adjacent lane is arranged to the left of the ego lane being driven on by the ego vehicle.

A second surroundings sector that extends starting from the front line (to the front) in the first adjacent lane ahead of the ego vehicle. The second surroundings sector possibly exists only when the first adjacent lane exists.

A third surroundings sector that extends starting from the front line (to the front) in the ego lane in front of the ego vehicle.

A fourth surroundings sector that extends starting from the front line (to the front) in a second adjacent lane in front of the ego vehicle. The fourth surroundings sector possibly exists only when a second adjacent lane is arranged to the right of the ego lane being driven on by the ego vehicle.

A fifth surroundings sector that extends starting from the front line (to the rear) in the second adjacent lane to the right and possibly behind the ego vehicle. The fifth surroundings sector possibly exists only when the second adjacent lane exists.

The control unit may thus be designed to limit the depiction of the surroundings of the ego vehicle to one or more (in particular to exactly five) surroundings sectors. The clarity of the depiction may thus be increased (in particular when driving on a multi-lane road, for instance a freeway).

The control unit may furthermore be designed to select, per surroundings sector, at most N road users in the respective surroundings sector. In this case, N may be identical for all surroundings sectors. Based on the surroundings data, it is possible to detect the various road users in the surroundings of the ego vehicle. These road users may be assigned to or associated with the different surroundings sectors. By way of example, a respective number of M road users may be identified for the different surroundings sectors. In this case, M may be different for the different surroundings sectors.

At most (or exactly) N road users per surroundings sector may then be selected from the number of road users in the different surroundings sectors. The N road users for a surroundings sector may in particular be selected from the set of M road users that are located in the surroundings sector. M may in this case be greater than, equal to or less than N. If M>N, then it is possible to select a subset of the road users that are located in the surroundings sector, if M=N, then all road users that are located in the surroundings sector may be selected, and/or if M<N (for example M=0), then possibly only M road users may be selected.

The control unit may in this case be designed to select, within a surroundings sector, the up to (or exactly) N road users that are closest to the ego vehicle, and/or that are arranged closest to the front line of the ego vehicle. It is thus possible, at a particular time and per surroundings sector, to select the up to N road users that have the greatest relevance to the ego vehicle.

In one preferred example, N=1 (for example for all surroundings sectors). It is thus possible, in each surroundings sector, to select the road user that has the greatest relevance to the ego vehicle. It is thus possible to increase the clarity of the depicted traffic situation in a particular manner.

The control unit may be designed, for each of the one or more surroundings sectors, to depict on the screen in each case (up to) N road user symbols for the at most N selected road users. In this case, exactly one road user symbol may be depicted for each selected road user. The display of road user symbols in a surroundings sector may in particular be limited to at most N symbols. It is thus possible to provide a particularly clear depiction of the relevant information of the surroundings of the ego vehicle in order to increase the comfort and the safety of the ego vehicle.

The control unit may be designed to display each of the one or more surroundings sectors in a different subregion of the screen. As already explained above, the ego symbol may be depicted in a (possibly fixed and/or central) ego region on the screen. The one or more surroundings sectors may be displayed in one or more subregions around the ego region. The first surroundings sector may in particular be displayed in a subregion to the left of the ego region, the second surroundings sector may be displayed in a subregion to the left and in front of the ego region, the third surroundings sector may be displayed in a subregion in front of the ego region, the fourth surroundings sector may be displayed in a subregion to the right and in front of the ego region and/or the fifth surroundings sector may be displayed in a subregion to the right of the ego region.

The control unit may furthermore be designed to depict on the screen in each case (up to) N road user symbols for the at most N selected road users in each of the one or more subregions for the one or more surroundings sectors. The current driving situation may thus be depicted on the screen of the ego vehicle in a particularly clear manner.

Each of the one or more surroundings sectors of the ego vehicle may be arranged in exactly one actual lane of the road on which the ego vehicle is driving. These may be the ego lane, the (first) adjacent lane arranged directly to the left of the ego lane and the (second) adjacent lane arranged directly to the right of the ego lane.

The control unit may be designed to depict the road user symbols in the one or more lanes displayed on the screen. An ego lane, an adjacent lane arranged to the left of the ego lane and an adjacent lane arranged to the right of the ego lane may in particular be depicted on the screen. In this case, the road user symbols, as indicated above, may preferably be depicted at one or more fixed possible lateral positions within the respective displayed lane. It is thus possible to further increase the clarity of a depicted traffic situation.

The control unit may be designed to detect that a first road user, starting from a departing surroundings sector, has penetrated into a receiving surroundings sector. This may be detected on the basis of the surroundings data. It may for example be detected in this case that a road user has penetrated into a receiving surroundings sector when 50% of the length of the road user has penetrated into the receiving surroundings sector.

The control unit may furthermore be designed, in response to it having been detected that the first road user has penetrated into the receiving surroundings sector, to depict a first road user symbol for the first road user in the subregion of the screen for the receiving surroundings sector. It is thus possible to depict changes in the traffic situation on the screen in a robust manner.

The control unit may furthermore be designed, in the event that a second road user symbol for a second road user was being depicted in the subregion of the screen for the receiving surroundings sector prior to the penetration of the first road user, to fade out the second road user symbol. The control unit may in particular be designed to fade out the second road user symbol only after a debouncing time (for example between 1 and 3 seconds) after the first road user has penetrated into the receiving surroundings sector has elapsed. As an alternative or in addition, the control unit may be designed to check whether the first road user remains within the receiving surroundings sector for the debouncing time without any interruption. The second road user symbol may then possibly be faded out only after the first road user has remained within the receiving surroundings sector for the debouncing time without any interruption. It is thus possible to depict a changing traffic situation on the screen in a particularly robust manner (in particular without flickering).

The control unit may furthermore be designed, in response to it having been detected that the first road user has penetrated into the receiving surroundings sector, to fade out the first road user symbol for the first road user in the subregion of the screen for the departing surroundings sector. The fading out may possibly take place immediately or only after the debouncing time has elapsed. The control unit may in particular be designed to fade out the first road user symbol in the subregion of the screen for the departing surroundings sector only when the first road user has penetrated into the receiving surroundings sector for at least the debouncing time without any interruption. It is thus possible to depict changes in the traffic situation on the screen in a robust manner.

The control unit may thus be designed such that only at most N road user symbols for the at most N selected road users are depicted for a surroundings sector in the subregion of the screen for the surroundings sector, apart from delayed fading out of a road user symbol as a result of a road user penetrating into the surroundings sector. It is thus possible to depict complex traffic situations in a particularly clear and quickly understandable manner on the screen of the ego vehicle in order to increase the comfort and the safety of the ego vehicle.

The control unit for depicting a traffic situation on the screen of the ego vehicle may be designed to depict a first road user symbol for a first road user in a first subregion of the screen. The first road user symbol may in this case be the ego symbol of the ego vehicle. The first subregion may be the ego vehicle. The ego region may for example be arranged centrally on the screen.

The control unit may furthermore be designed to display a second road user symbol for a second road user in a second subregion of the screen. The relative positioning of the second subregion (that is to say the second road user symbol) in relation to the first subregion (that is to say in relation to the first road user symbol) in this case typically depends on the positioning of the second road user in relation to the first road user. This relative positioning may be ascertained on the basis of the surroundings data.

The road user symbol for a road user may comprise an abstract graphical depiction of a particular type or a particular class of road users. By way of example, an automobile may be represented on the screen by the symbol of an automobile, a truck may be represented on the screen by the symbol of a truck and/or a motorcycle may be represented on the screen by the symbol of a motorcycle. The control unit may be designed to ascertain the class of the second road user from a plurality of predefined classes. The control unit may furthermore be designed to depict a second road user symbol, dependent on the class of the second road user, on the screen.

The symbol for a class of road users may have a particular size that is typical for the class of road users, but that does not necessarily correspond to the actual size of the actual road user. The size of the second road user symbol may thus be at least partially independent of the (actual) size of the second road user. The size of the second road user symbol in relation to the size of the first road user symbol may in particular be greater than the size of the second road user in relation to the size of the first road user.

Selecting standardized symbols for the road users of a traffic situation allows the driver of the ego vehicle to understand the essential information quickly and reliably for the traffic situation. On the other hand, using symbols with standardized sizes and/or with standardized animations (for example for lane changes) may lead to there being a graphical overlap between two symbols for two road users on the screen (even when no actual collision between the two road users takes place). Such a graphical overlap of symbols is also referred to in this document as a virtual collision of symbols.

The control unit may be designed to determine that the first road user symbol and the second road user symbol are approaching one another in a particular and/or in a predefined manner based on a change in the positioning of the second road user in relation to the first road user. The control unit may in particular be designed to determine, based on a change in the positioning of the second road user in relation to the first road user (which is able to be ascertained on the basis of the surroundings data), that the second road user symbol is penetrating into a boundary area for the first subregion of the first road user symbol. The boundary area may in this case adjoin the first subregion and/or be arranged next to the first subregion. It is thus possible to provide one or more boundary areas around a road user symbol (in particular around the ego symbol of the ego vehicle) that may be considered to be buffer areas for the road user symbol. Providing one or more boundary areas makes it possible to identify possible virtual collisions between depicted symbols in an efficient and reliable manner and to avoid said collisions based thereon.

The control unit may furthermore be designed, in response to identifying the approach and/or the penetration of the second road user symbol into a boundary area of the first road user symbol, to at least partially fade out the first road user symbol and/or the second road user symbol. The second road user symbol may in particular be at least partially faded out. At least partially (or possibly completely) fading out the second road user symbol makes it possible to reliably avoid virtual collisions between symbols on the screen. It is thus possible to bring about a consistent depiction of the traffic situation, thereby increasing the comfort and the safety of the ego vehicle.

The control unit may in particular be designed to take into consideration the following one or more boundary areas for the first road user symbol:

A first boundary area in the direction of travel of the first road user in front of the first road user symbol. The second road user symbol may be gradually faded out in the first boundary area (for example on the basis of the penetration depth of the second road user symbol in the longitudinal direction).

A second boundary area between the first boundary area and the first subregion. The second road user symbol may be faded out abruptly and completely in the second boundary area.

A third boundary area in relation to the direction of travel to the left of the first road user symbol. The second road user symbol may be faded out gradually in the third boundary area (for example on the basis of the penetration depth of the second road user symbol in the transverse direction).

A fourth boundary area in relation to the direction of travel to the right of the first road user symbol. The second road user symbol may be faded out gradually in the fourth boundary area (for example on the basis of the penetration depth of the second road user symbol in the transverse direction).

A fifth boundary area in relation to the direction of travel behind the first road user symbol. An increased, fixed transparency value (for example between 40% and 60%) of the second road user symbol may be adjusted abruptly in the fifth boundary area.

Providing different boundary areas makes it possible to provide a particularly efficient and quickly understandable depiction of the traffic situation.

A boundary area may have a particular length (in the direction of travel of the first road user) and a particular width (transverse to the direction of travel of the first road user). The control unit may be designed to ascertain speed data (in particular on the basis of the surroundings data). The speed data may indicate the relative speed at which the second road user symbol is moving toward the boundary area of the first subregion. As an alternative or in addition, the speed data may indicate the relative speed between the first road user and the second road user. In this case, speed data in relation to a relative speed in the transverse direction and/or in relation to a relative speed in the longitudinal direction of the first road user and/or the second road user may in particular be ascertained.

The control unit may furthermore be designed to adapt the dimension, in particular the length and/or the width, of the boundary area on the basis of the speed data. The control unit may in particular be designed to adapt the length of the boundary area on the basis of the speed data in relation to the relative speed in the longitudinal direction, and/or to adapt the width of the boundary area on the basis of the speed data in relation to the relative speed in the transverse direction.

In this case, the dimension of a boundary area may be increased as relative speed increases and/or reduced as relative speed decreases, in particular such that the time in which the second road user symbol passes through the boundary area remains constant and/or is independent of the relative speed.

Adapting the dimension of a boundary area on the basis of the relative speed between the symbols or between the road users makes it possible to depict (collision-free) position changes of road users on the screen in a particularly consistent and comprehensible manner.

The control unit may be designed to ascertain the penetration depth to which the second road user symbol penetrates into a boundary area for the first subregion of the first road user symbol. The penetration depth may be considered to be the portion of the length and/or the width of the boundary area to which the second road user symbol penetrates into the boundary area. At the beginning of penetration, the penetration depth may be 0%, and in the case of complete penetration over the entire length and/or the entire width of the boundary area, the penetration depth may be 100%. In the first boundary area, for example, the penetration depth in relation to the length of the first boundary area may be considered. On the other hand, in the third and/or fourth boundary area, the penetration depth in relation to the width of the respective boundary area may be considered.

The control unit may be designed to adapt the degree of fading out and/or the transparency of the second road user symbol on the basis of the penetration depth. The control unit may in particular be designed to increase the transparency and/or the degree of fading out of the second road user symbol as penetration depth increases, and/or to reduce the transparency and/or the degree of fading out of the second road user symbol as penetration depth decreases.

By way of example, at 0% penetration depth, the transparency and/or the degree of fading out may be 0%, and at 100% penetration depth, the transparency and/or the degree of fading out may be 100%. Between these, there may for example be a linear profile of the transparency and/or the degree of fading out as a function of penetration depth. Gradually fading out a symbol makes it possible to display (collision-free) position changes of road users on the screen in a particularly consistent and comprehensible manner.

The control unit may be designed to ascertain the type of the boundary area from a plurality of predefined types. The plurality of types may comprise: a type in which the degree of transparency and/or fading out of a penetrating road user symbol increases (steadily) with increasing penetration depth; a type in which the degree of transparency and/or fading out of a penetrating road user symbol is adjusted suddenly as penetration occurs to a fixed transparency value (for example between 40% and 60%); and/or a type in which a penetrating road user symbol is faded out suddenly as penetration occurs.

The control unit may furthermore be designed to at least partially fade out the second road user symbol on the basis of the type of the boundary area. Taking into consideration different types of boundary areas (at different edges of the first road user symbol) makes it possible to avoid virtual collisions in different regions of the road user or of the corresponding road user symbol in a reliable and consistent manner.

The control unit may be designed to determine that the second road user is an object relevant to a driving function of the ego vehicle. By way of example, the second road user may be considered to be an object relevant to a distance and/or speed controller of the ego vehicle when the second road user serves as control object for the distance and/or speed controller. As an alternative or in addition, the second road user may be considered to be an object relevant to a collision warning system of the ego vehicle when the collision warning system identifies a risk of a possible (actual) collision between the ego vehicle and the second road user.

The control unit may furthermore be designed, in response to the second road user having been identified as an object relevant to a driving function, to suppress the at least partial fading out of the second road user symbol. The fading out may also be suppressed when the second road user symbol penetrates into a boundary area of the first subregion. The consistency of the depiction is thus able to be further increased. It is thus in particular possible to reliably avoid irritating the driver of the ego vehicle through fading out of a relevant object.

The control unit may be designed to determine, based on the change in the positioning of the second road user in relation to the first road user, whether there is a risk of a collision between the second road user and the first road user. This may be ascertained on the basis of the surroundings data. It is in particular possible to ascertain whether the risk of an actual collision is greater than or less than a predefined probability threshold value.

The control unit may furthermore be designed to suppress the at least partial fading out of the second road user symbol when it is determined that there is a risk of a collision between the second road user and the first road user. As an alternative or in addition, the control unit may be designed to bring about the at least partial fading out of the second road user symbol (in particular only) when it is determined that there is no risk of a collision between the second road user and the first road user.

Taking into consideration the risk or the probability of an actual collision of a road user when fading out a symbol for the road user makes it possible to further increase the consistency of the depiction of the traffic situation in order to further increase the comfort and the safety of the ego vehicle.

A road user symbol may be faded out such that the entire symbol is at least partially faded out (possibly even when the entire symbol has not penetrated into a boundary area). As an alternative, possibly only that part of the symbol that has penetrated into the boundary area may be faded out (while that part of the symbol that has not penetrated continues to be displayed without being faded out and/or with 0% transparency). The last variant in particular makes it possible to further increase the consistency of the depiction of the traffic situation in the surroundings of the ego vehicle.

The control unit may be designed to ascertain size information in relation to the size (for example the length and/or the width) of the ego vehicle. The size (for example the length and/or the width) of a boundary area that adjoins the ego region or the ego symbol may then be adapted on the basis of the size information. The size of the boundary area may in particular be increased as the size of the ego vehicle increases (and vice versa). Virtual collisions are thus able to be avoided with increased consistency.

The control unit may be designed to ascertain density information in relation to the traffic density of the traffic situation in the surroundings of the ego vehicle. The size (for example the length and/or the width) of the boundary area may then be adapted on the basis of the density information. The size of the boundary area may in particular be reduced as traffic density increases (and vice versa). Virtual collisions are thus able to be avoided with increased consistency.

As already explained above, the control unit for depicting a traffic situation on the screen of the ego vehicle may be designed to depict on the screen a road user symbol for a road user involved in the traffic situation. The road user symbol may in this case display a class of the road user. The class of the road user may in this case be ascertained by the control unit. The displayed class may correspond to the class to which the road user has been assigned (for example on the basis of the surroundings data and/or on the basis of the surroundings model). The assigned class may possibly be incorrect (for example due to insufficient surroundings data and/or due to partial concealment of the road user).

The control unit may furthermore be designed to continuously determine, over a minimum duration, that the road user has another class. In other words, it may be repeatedly checked (for example at a sequence of times) whether the road user should be assigned to another class. This may be checked on the basis of the surroundings data. It may then be determined that the road user has been assigned permanently, for at least the minimum duration, to the fixed or the same other (particular) class. It may in particular be determined that the road user has been assigned exclusively to the particular other class for at least the minimum duration.

The control unit may furthermore be designed to adapt the road user symbol displayed for the road user to the (particular) other class (only) when it has been determined, continuously and/or exclusively, for the minimum duration, that the road user has the particular other class. The minimum duration may for example be between 1 second and 3 seconds.

It is thus possible to bring about a delayed display of the (identified) change in class of a road user (by changing the depicted class-dependent symbol). It is thus possible to reliably avoid repeated changes in the displayed class and associated irritation of the driver of the ego vehicle, in order to increase the comfort and the safety of the ego vehicle.

The control unit may be designed to assign the road user involved in the traffic situation to the other class and/or to adapt the road user symbol for the road user to the other class only when

- it has been determined continuously (at least) for the minimum duration that the road user belongs to the other class; and/or
- the confidence of the road user belonging to the other class is the same as or greater than a (predefined) confidence threshold value; and/or
- the road user has an (actual) dimension, in particular an (actual) length and/or a width, which matches the typical dimension of the other class.

Taking into consideration one or more conditions for the change of a class-dependent road user symbol makes it possible to reliably avoid irritating, changing displays of classes on the screen, thereby increasing the comfort and the safety of the ego vehicle.

The control unit may be designed to suppress a future change of class of a road user and/or a change of the road user symbol for the road user as soon as the road user has been assigned to the same class for at least a minimum holding time. The minimum holding time may for example be between 2 seconds and 5 seconds. Future changes of the displayed class may thus be suppressed when the road user has already been assigned to the currently displayed class without any interruption over a relatively long period (on the basis of the surroundings data). The depiction of the traffic situation is thus able to be made more stable in order to further increase the comfort and the safety of the ego vehicle.

The control unit may be designed to select the class of the road user from a list of predefined classes. The list of classes may comprise an automobile, a truck and/or a motorcycle. It is thus possible to take into consideration a limited list of possible classes (for example 5 or fewer, 4 or fewer, or 3 or fewer classes). The restriction to a limited list of classes makes it possible to increase the quality of the classification.

The control unit may be designed to depict on the screen in each case (exactly) one class-specific road user symbol for a road user for each class from the (limited) list of predefined classes. In this case, only exactly one class-specific road user symbol is preferably provided for each class. Using a limited number of different road user symbols for a corresponding limited number of classes makes it possible to further increase the clarity of the depiction of the traffic situation.

The size, in particular the width and/or the length, of the class-specific road user symbol may, for at least one or more classes (in particular for automobiles and/or motorcycles), be independent of the actual size, in particular of the width and/or the length, of the road user that is represented by the road user symbol. Depicting symbols for a class of uniform size makes it possible to further increase the clarity of the display of the traffic situation.

On the other hand, the control unit may be designed to ascertain length data in relation to the length of a road user involved in the traffic situation (on the basis of the surroundings data). The length of the road user symbol for the road user may then be adapted on the basis of the length data. This may be used, in particular for the class of trucks, to be able to efficiently take into consideration the relatively large range of possible lengths of trucks. Taking into consideration the length data makes it possible to further improve the consistency of the depiction of the traffic situation.

The control unit may be designed to increase the length of a road user symbol on the basis of updated length data over time. By way of example, respectively updated length data may be ascertained at a sequence of times (on the basis of the surroundings data). If the length data indicate a larger length of the road user than previously assumed, then the corresponding symbol may also be lengthened. On the other hand, a reduction in the length of the road user symbol may possibly be suppressed (independently of the length data), even when the length data at least temporarily have a shorter length. It is thus possible to provide a consistent and stable depiction of the traffic situation on the screen.

The control unit may be designed to determine (for example on the basis of the surroundings data) that a road user involved in the traffic situation is approaching the ego vehicle from behind. The class of a road user that is approaching the ego vehicle from behind cannot typically be determined with a high level of confidence. The road user may therefore initially be assigned to a standard class, and/or a symbol for a standard class may initially be displayed on the screen. The standard class may in this case correspond to the class of automobiles. Using a standard class makes it possible to further increase the stability and the consistency of the depiction of the traffic situation on the screen.

The control unit may be designed to display an image in relation to the traffic situation on the screen of the ego vehicle. A corresponding sequence of images may in particular be displayed on the screen at a sequence of times. In this case, each image may represent the traffic situation and/or the state of one or more driving functions of the ego vehicle at a particular time. A respective road user symbol may be displayed in the image for at least one or more of the road users involved in the traffic situation. An ego symbol may furthermore be displayed in the image for the ego vehicle. One or more displayed lanes may also be depicted. The image for a particular time may be composed on the basis of the surroundings data and/or on the basis of state data in relation to the state of one or more driving functions of the ego vehicle. Displaying a sequence of images at a sequence of times on the screen makes it possible to depict the temporal evolution of a traffic situation in the surroundings of the ego vehicle in an efficient and reliable manner.

The control unit may thus be designed to ascertain an image in relation to the traffic situation in the surroundings of the ego vehicle on the basis of surroundings data from one or more surroundings sensors of the ego vehicle (at a particular time). The image may in this case have a timestamp in relation to the on-board power system time of the ego vehicle. The on-board power system time may be provided for example by a time master of the ego vehicle.

The control unit may in particular be designed to ascertain or to compose the image in relation to the traffic situation on the basis of information from a plurality of information sources. The information from an information source may in this case have a respective timestamp. Examples of information sources are: The one or more surroundings sensors of the ego vehicle; a fusion unit of the ego vehicle for ascertaining a surroundings model of the surroundings of the ego vehicle on the basis of the surroundings data (in particular by fusing the surroundings data); and/or one or more driving functions of the ego vehicle for the at least partially automated longitudinal and/or transverse guidance of the ego vehicle.

It is thus possible to take into consideration information from different information sources in order to create an image in relation to the traffic situation, wherein the image is intended to be depicted on the screen at a particular display time. The control unit may be designed to ascertain the timestamp of the image such that the timestamp of the image corresponds to the earliest timestamp and/or an invalid timestamp of the information used to ascertain the image. It is thus possible to ascertain a "worst-case" timestamp for the image that indicates the age of the oldest information in the image.

The control unit may be designed to check, in particular at a reference time for the image, whether the timestamp is more than a maximum permissible latency time ahead of the reference time and/or whether the timestamp is invalid. The reference time may in this case relate to the on-board power system time. The reference time may be the output time for the image or the reference time may be a check time for the image at which the latency or delay of the image is checked. The latency time may for example be between 0.5 seconds and 1.5 seconds. It is thus possible to check, prior to outputting the image on the screen, whether the image is possibly out of date.

The control unit may furthermore be designed to suppress the outputting of the image on the screen when it has been determined that the timestamp is more than the maximum permissible latency time ahead of the reference time and/or that the timestamp is invalid. The control unit may in particular be designed to output the image on the screen only when it has been determined that the timestamp is at most the maximum permissible latency time ahead of the reference time and that the timestamp is valid. If the image is not output on the screen, the screen may possibly be deactivated or set to "black" or another information display (for example the display of a navigation device) may be deactivated.

Checking the timestamp of an image to be output makes it possible to reliably guarantee that the information output on the screen in relation to the traffic situation is always up-to-date. The safety of the ego vehicle may thus be increased.

The control unit may be designed to ascertain a respective current image in relation to the traffic situation in the surroundings of the ego vehicle (with a respective current timestamp) at a sequence of reference times (for example at a sequence of output times and/or check times). The control unit may furthermore be designed to output the respective current image on the screen when it is determined that the timestamp of the respective current image is at most the maximum permissible latency time ahead of the respective reference time and that the timestamp is valid. If this is not the case, the outputting of the respective image may be suppressed or there may be a changeover to an information display. It is thus possible, for the duration of operation of the ego vehicle, to bring about a reliable depiction of the respective current traffic situation in the surroundings of the ego vehicle.

The control unit may be designed to bring about a situation whereby no image, including no past and/or previous image, in relation to the traffic situation in the surroundings of the ego vehicle is depicted on the screen when it has been determined that the timestamp is more than the maximum permissible latency time ahead of the reference time and/or that the timestamp is invalid. It is thus possible to further increase the reliability of the depiction of the traffic situation and the safety of the ego vehicle.

The control unit may be designed, after suppressing the output of the image at the reference time, to output an image in relation to the traffic situation in the surroundings of the ego vehicle on the screen again only after a minimum interruption time (for example between 1 and 3 seconds) has elapsed (but only when the image again meets the abovementioned requirement in relation to the maximum permissible latency time). Temporarily suppressing the outputting of images makes it possible to further increase the stability of the depiction of the traffic situation. Flickering of the image depicted on the screen and associated distraction and/or irritation of the driver of the ego vehicle may in particular be avoided.

As already explained above, the control unit may be designed to ascertain an image in relation to the traffic situation in the surroundings of the ego vehicle on the basis of a fusion of the surroundings data from the one or more surroundings sensors. The fusion may in this case take place such that the fusion of the surroundings data has an invalid timestamp when the surroundings data from the one or more surroundings sensors are at least partially invalid and/or when the surroundings data of a particular (for example critical) number of surroundings sensors are defective or are invalid and/or when the odometry of the ego vehicle is defective. Whether the fusion of the surroundings data is assigned an invalid timestamp may depend on the state of the ego vehicle and/or on the traffic situation and/or on an active driving function. In particular, the fusion of the surroundings data may be assigned an invalid timestamp possibly only in the event of a critical degradation situation with the surroundings sensor system.

The control unit may furthermore be designed to assign an invalid timestamp to the image when the fusion of the surroundings data has an invalid timestamp. It is thus possible to further increase the reliability of an image output on the screen in relation to the traffic situation.

According to a further aspect, this document describes a system for an ego vehicle that comprises the control unit described in this document and a screen for the ego vehicle. The system may furthermore comprise one or more surroundings sensors.

According to a further aspect, a description is given of a (road-bound) motor vehicle (in particular an automobile or a truck or a bus or a motorcycle) that comprises the control unit described in this document and/or the system described in this document.

According to a further aspect, a description is given of a method (and a corresponding control unit) for depicting a traffic situation on a screen of an ego vehicle. The method comprises depicting a road user symbol for at least one road user of the traffic situation who is driving in an actual lane at a constant first lateral position within a lane displayed on the screen. The method furthermore comprises detecting a lane event in relation to the road user departing the actual lane. A lane event may in particular be detected in relation to the fact that the road user has partially departed, is partially departing, will partially depart, could partially depart or should partially depart the actual lane. The method furthermore comprises, in response thereto, depicting the road user symbol at a second lateral position, deviating from the first lateral position, within the displayed lane.

According to a further aspect, a description is given of a method (and a corresponding control unit) for depicting a traffic situation on a screen of an ego vehicle. The method comprises selecting at most N road users in each of one or more different surroundings sectors of surroundings of the ego vehicle. The method furthermore comprises depicting, for each of the one or more surroundings sectors, a respective road user symbol for each of the at most N selected road users on the screen.

According to a further aspect, a description is given of a method (and a corresponding control unit) for depicting a traffic situation on a screen of an ego vehicle. The method comprises depicting a first road user symbol for a first road user in a first subregion of the screen and a second road user symbol for a second road user in a second subregion of the screen, wherein a positioning of the second subregion in relation to the first subregion depends on a positioning of the second road user in relation to the first road user. The method furthermore comprises determining, based on a change in the positioning of the second road user in relation to the first road user, that the first and the second road user symbol are approaching one another, in particular the second road user symbol is penetrating into a boundary area for the first subregion of the first road user symbol. The method furthermore comprises, in response thereto, bringing about a situation whereby the second road user symbol is at least partially faded out.

According to a further aspect, a description is given of a method (and a corresponding control unit) for depicting a traffic situation on a screen of an ego vehicle. The method comprises depicting a road user symbol for a road user involved in the traffic situation on the screen, wherein the road user symbol displays a class of the road user. The method furthermore comprises continuously determining, over a minimum duration and/or over a minimum quality, that the road user has a particular constant other class. The method furthermore comprises, in response thereto, adapting the road user symbol displayed for the road user to the particular other class.

According to a further aspect, a description is given of a method (and a corresponding control unit) for displaying an image in relation to a traffic situation on a screen of an ego vehicle. The method comprises ascertaining, on the basis of surroundings data from one or more surroundings sensors of the ego vehicle, an image in relation to a traffic situation in a surroundings of the ego vehicle, wherein the image has a timestamp in relation to an on-board power system time of the ego vehicle. The method furthermore comprises checking, in particular at a reference time of the on-board power system time, whether the timestamp is more than a maximum permissible latency time ahead of the reference time and/or whether the timestamp is invalid. The method furthermore comprises suppressing outputting of the image on the screen when it has been determined that the timestamp is more than the maximum permissible latency time ahead of the reference time and/or that the timestamp is invalid.

According to a further aspect, a description is given of a software (SW) program. The SW program may be designed to be executed on a processor (for example on a controller of a vehicle) and thereby to carry out at least one of the methods described in this document. According to a further aspect, a description is given of a storage medium. The storage medium may comprise a SW program that is designed to be executed on a processor and thereby to carry out at least one of the methods described in this document.

It should be noted that the methods, devices and systems described in this document may be used both on their own and in combination with other methods, devices and systems described in this document. Furthermore, any aspects of the methods, devices and systems described in this document may be combined with one another in a wide variety of ways.

The invention is described in more detail below with reference to exemplary embodiments.

DETAILED DESCRIPTION OF THE DRAWINGS

Figure 1A:
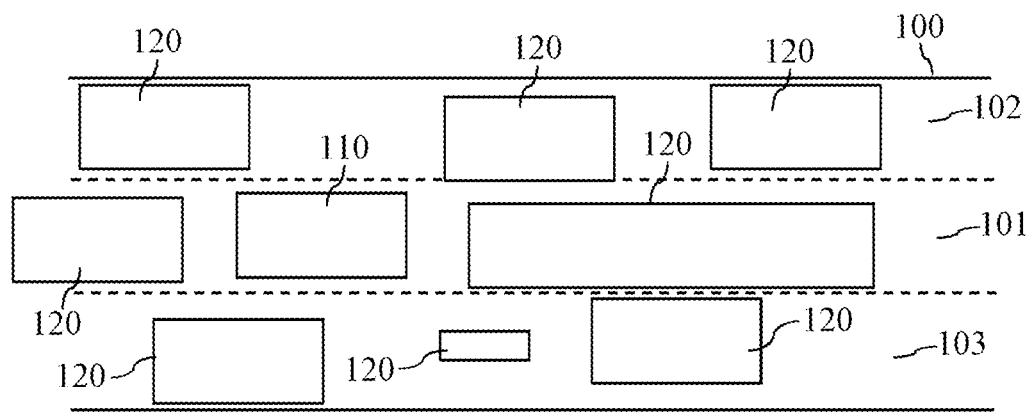
FIG. 1a shows an exemplary traffic situation in the surroundings of an ego vehicle.

As explained at the outset, the present document deals with outputting image information in relation to a traffic situation in the surroundings of an ego vehicle on a screen of the ego vehicle. In this connection, FIG. 1a shows an exemplary traffic situation of an ego vehicle 110 on a multi-lane (actual) road 100 having an ego lane 101 on which the ego vehicle 110 is driving, and having one or more adjacent lanes 102, 103. A plurality of different other road users 120 (in particular other vehicles) are located in the surroundings of the ego vehicle 110. The other road users 120 may belong to different classes. Examples of classes are: automobile, truck, bus, motorcycle, etc.

Figure 1B:
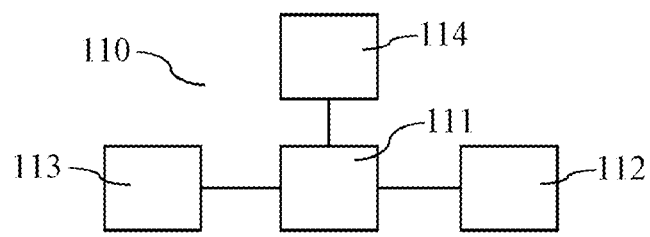
FIG. 1b shows exemplary components of an ego vehicle.

FIG. 1b shows exemplary components of an ego vehicle 110. The ego vehicle 110 comprises one or more surroundings sensors 112 that are designed to acquire surroundings data (that is to say sensor data) in relation to the surroundings of the ego vehicle 110. Examples of surroundings sensors 112 are an image camera, a radar sensor, a lidar sensor, an ultrasound sensor, etc.

The ego vehicle 110 may furthermore comprise one or more actuators 113 for the automated longitudinal and/or transverse guidance of the ego vehicle 110. Examples of actuators 113 are a drive motor, a braking device and/or a steering device.

The ego vehicle 110 may furthermore comprise a screen 114 that is designed to depict images with N×M pixels, where N and/or M may be 100 or more, 200 or more or 500 or more. The screen 114 may for example comprise a TFT (thin-film transistor) screen and/or an LCD (liquid crystal display) screen and/or an LED (light-emitting diode) screen. As an alternative or in addition, the screen may comprise a head-up display and/or a projector that is designed to project an image onto a surface. The screen 114 may be arranged in the interior of the ego vehicle 110 and/or on a dashboard or on a central console of the ego vehicle 110.

A control unit 111 of the ego vehicle 110 may be designed to ascertain a surroundings model in relation to the surroundings of the ego vehicle 110 on the basis of the surroundings data. The surroundings model may for example describe one or more other road users 120 in the surroundings of the ego vehicle 110 and/or the number of lanes 101, 102, 103 of the road 100 being driven on by the ego vehicle 110. The control unit 111 may be designed to operate the one or more actuators 113 of the ego vehicle 110 on the basis of the surroundings model, for example in order to provide a driving function or a driver assistance function (for instance a lane keep assistant, a lane change assistant, adaptive cruise control, etc.).

The control unit 111 may furthermore be designed to ascertain an image in relation to the surroundings of the ego vehicle 110 on the basis of the surroundings data and/or on the basis of the surroundings model. A respective image of the respectively current traffic situation in the surroundings of the ego vehicle 110 may in particular be ascertained for a sequence of successive times. The image or the sequence of images may then be output on the screen 114 of the ego vehicle 110 in order to assist the driver of the ego vehicle 110 with the longitudinal and/or transverse guidance of the ego vehicle 110.

Figure 2A:
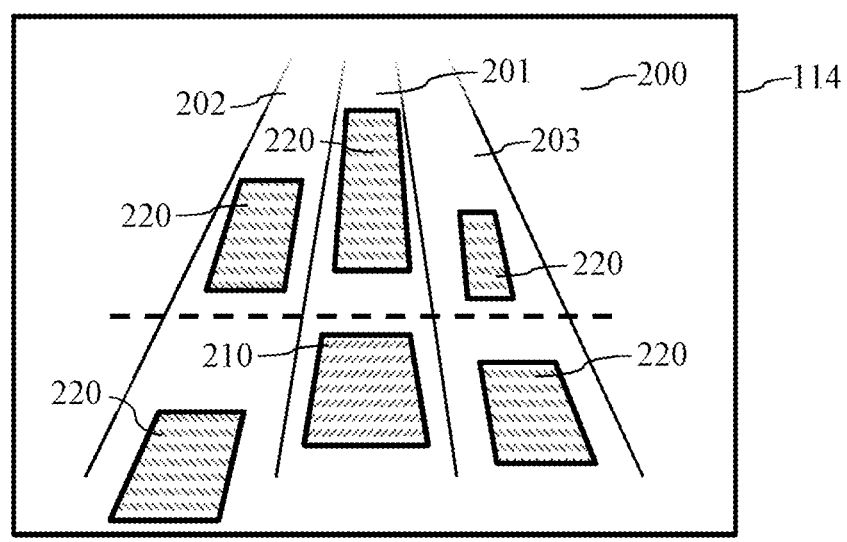
FIG. 2a shows an exemplary image in relation to a traffic situation in the surroundings of an ego vehicle.

FIG. 2a shows an exemplary image 200 in relation to a traffic situation in the surroundings of the ego vehicle 110. The image 200 comprises an (abstract) lane depiction 201 of the ego lane 101 and lane depictions 202, 203 for one or more adjacent lanes 102, 103. A lane depiction 201, 202, 203 is also referred to as a "displayed lane" in this document.

The image 200 furthermore comprises road user symbols 220 for one or more road users 120 in the surroundings of the ego vehicle 110. A road user symbol 210 for the ego vehicle 110 may furthermore possibly be displayed, this also being referred to as ego symbol and possibly showing details of the ego vehicle and/or the state of the ego vehicle.

The image 200 may be generated on the basis of the surroundings data and/or the surroundings model such that the ego symbol 210 has a fixed position (for example horizontally central, in the lower region of the image 200). The fixed position may in this case remain unchanged over time. A driver of the ego vehicle 110 is thus given the ability to quickly understand the information depicted in an image 200 in relation to the surroundings of the ego vehicle 110 (since the ego vehicle 110 or the ego symbol 210 are able to be located quickly within the image 200).

Figure 2B:
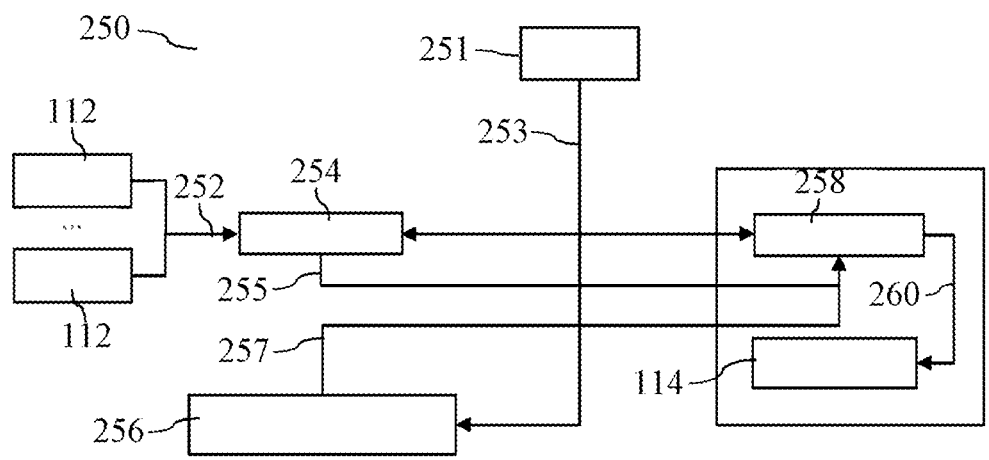
FIG. 2b shows an exemplary system for outputting an image on a screen of an ego vehicle.

FIG. 2*b* shows an exemplary system 250 for outputting an image 200 on the screen 114 of the ego vehicle 110. The system 250 comprises a time master 251 that is designed to provide a synchronized on-board power system time 253 within the ego vehicle 110.

Based on the surroundings data 252 from the one or more surroundings sensors 112 of the ego vehicle 110, a surroundings image and/or a surroundings model 255 of the surroundings of the ego vehicle 110 is generated in a fusion unit 254 (for example through data fusion). The surroundings data 252 from the individual surroundings sensors 112 each have a timestamp (in relation to the on-board power system time 253). The fusion unit 254 may use the timestamp of the surroundings data 252 to fuse surroundings data 252 that relate to the same time or timestamp with one another. The surroundings image 255 provided by the fusion unit 254 thus typically has a uniform timestamp.

One or more driving functions 256 (in particular driver assistance systems) may furthermore comprise function information 257. The function information 257 may for example provide information as to whether a particular driving function 256 is activated and/or the function information 257 may refer to elements of the surroundings model or of the surroundings image 255, for example with regard to a control target. The function information 257 may furthermore comprise information in relation to at least one active driving function 256 that is intended to be depicted in the image 200 displayed on the screen 114. By way of example, in the case of ACC, the target distance from a vehicle ahead may be displayed. The function information 257 may have a timestamp that indicates the time at which the function information 257 was valid.

An output unit 258 of the system 250 may be designed, taking into consideration the timestamp, to combine a surroundings image and/or a surroundings model 255 with the appropriate function information 257 and to further process the combination thereof in order to ascertain image data 260 for the image 200 to be depicted. The image data 260 may be transferred to the screen 114 such that the image 200 is reproduced on the screen 114. The image 200 in this case typically has a uniform timestamp for all of the information depicted in the image 200.

Correspondingly, a respective image 200 may be generated and displayed at a sequence of times (or for a sequence of timestamps). The individual images 200 comprise (abstract) information in relation to the surroundings of the ego vehicle 110 and/or function information 257 in relation to one or more active driving functions 256 of the ego vehicle 110.

The relative positioning of the individual road users 120 in relation to one another and/or in relation to the ego vehicle 110 typically changes constantly. The lateral position of the individual road users 120 within the individual lanes 101, 102, 103 may in particular change over time. This typically results in a situation whereby the lateral position of the individual road user symbols 220 within the depicted lanes 201, 202, 203 in a sequence of images 200 also continuously changes. This leads to an unsteady and unclear depiction of the surroundings of the ego vehicle 110 on the screen 114. This may also lead to a situation whereby the driver of the ego vehicle 110 is distracted from the actual driving task by the constant changes on the screen 114.

In order to steady the depiction of the surroundings of the ego vehicle 110, it is possible to stipulate that a road user symbol 220 for a road user 120 is positioned only at a limited number (for example at most three) of lateral positions within a depicted lane 201, 202, 203 (independently of the actual lateral position of the road user 120 within the actual lane 101, 102, 103). The output unit 258 may in particular bring about a situation whereby the road user symbols 220 of the one or more road users 120 in the surroundings of the ego vehicle 110 are always depicted in the image 200 at a fixed lateral position (for example centrally) within the individual displayed lanes 201, 202, 203. It is thus possible, at a sequence of times, to output images 200 that steadily schematically reproduce the surroundings of the ego vehicle 110. As a result thereof, it is possible for the driver of the ego vehicle 110 to understand a traffic situation reliably and quickly.

Correspondingly, the lateral position of the ego symbol 210 for the ego vehicle 110 may also be limited to a limited number of positions within the displayed ego lane 201. By way of example, in the normal case, the ego symbol 210 may be depicted at a single standard position (for example centrally) within the ego lane 201.

The control unit 111 of the ego vehicle 110 may be designed to detect a lane event in relation to the transverse guidance of the ego vehicle 110 and/or in relation to a positioning of the ego vehicle 110 within the ego lane 101. Examples of events are:
- actuation of the steering device (in particular the steering wheel) of the ego vehicle 110 in order to bring about transverse guidance of the ego vehicle 110;
- an intervention in the transverse guidance of the ego vehicle 110 by a driving function 256 (for example for a lane change);
- a warning in relation to the lane keeping of the ego vehicle 110 (for example a lane departure warning);
- active navigation of the ego vehicle 110 that indicates that the ego vehicle 110 should or will change lane 101, 102, 103 in the near future; and/or
- a request to form an emergency lane.

The control unit 111 may furthermore be designed to adapt the lateral position of the ego symbol 210 in response to a detected lane event (deviating from the standard position). In this case, only a limited number of positions may again be made possible. By way of example, the ego symbol 210 may
- be depicted in a left-hand lateral position when the ego vehicle 110 is located relatively far to the left within the ego lane 101;

be depicted in a central lateral position (for example the standard position) when the ego vehicle 110 is located relatively centrally within the ego lane 101; and/or be depicted in a right-hand lateral position when the ego vehicle 110 is located relatively far to the right within the ego lane 101; and/or be depicted in a side lateral position (for example to the right or to the left) when, although the ego vehicle 110 is located relatively centrally within the ego lane 101, the driver should be informed that he should steer the vehicle 110 toward this side (for example the right-hand side or the left-hand side).

There may possibly be a smoothed and/or constant transition of the depiction of the ego symbol 210 between the positions.

Figure 3A:
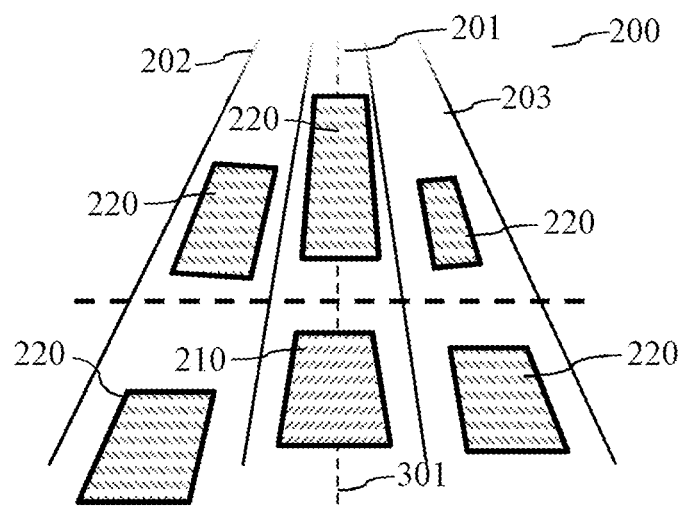
FIGS. 3a to 3c show exemplary images for reproducing a traffic situation.

FIG. 3*a* shows an exemplary arrangement of the ego symbol 210 and of the road user symbols 220 at a central lateral position in the respectively displayed lane 201, 202, 203. In this case, a central line 301 is illustrated in FIG. 3*a* for the displayed ego lane 201 (this central line typically not being reproduced in the image 200).

Figure 3B:
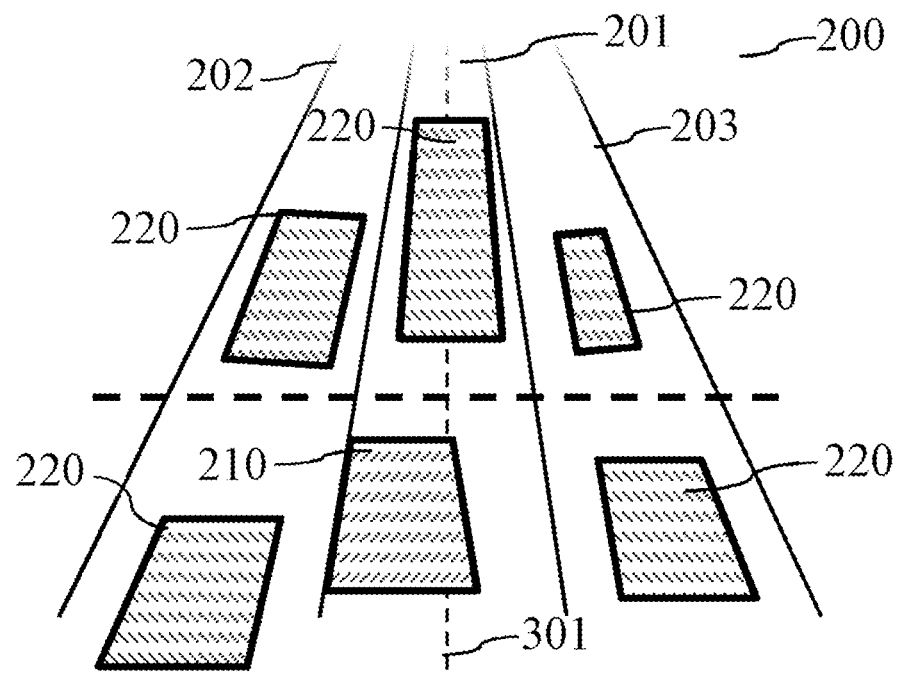

FIG. 3*b* shows an exemplary arrangement of the ego symbol 210 in a left-hand lateral position within the displayed ego lane 201. The road user symbols 220 are still depicted at the central lateral position in the respective displayed lane 201, 202, 203. Such a display may take place for example after a lane event has been detected in the event of a lane change warning of the ego vehicle 110 concerning the adjacent lane 102.

Figure 3C:
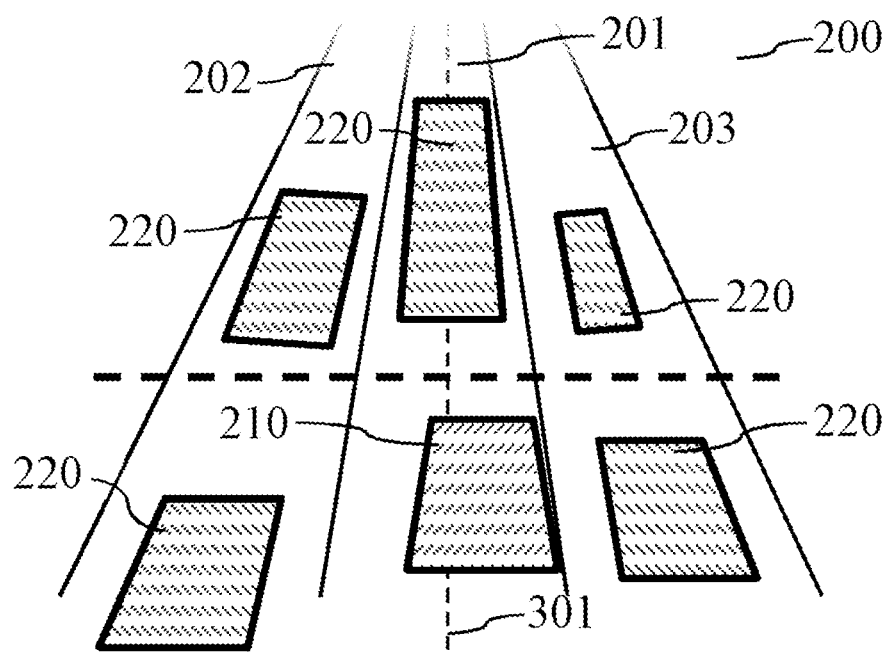

FIG. 3*c* shows an exemplary arrangement of the ego symbol 210 in a right-hand lateral position within the displayed ego lane 201. The road user symbols 220 are still depicted at the central lateral position in the respective displayed lane 201, 202, 203. Such a display may take place for example after a lane event has been detected in the event of a lane change warning of the ego vehicle 110 concerning the adjacent lane 103.

Figure 3D:
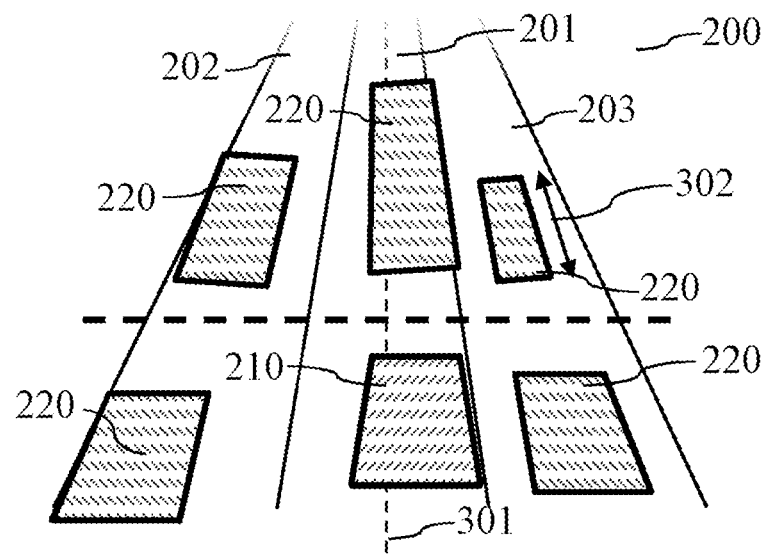
FIG. 3d shows an exemplary image for depicting an emergency lane.

FIG. 3*d* shows an exemplary arrangement of the ego symbol 210 and of the road user symbols 220 in the presence of a request to form an emergency lane. In this case, as an exception, the road user symbols 220 of one or more road users 120 in the surroundings of the ego vehicle 110 may also be arranged on the lanes 201 and 202 depicted in the example, deviating from the standard position (in particular the central lateral position) in order to clearly indicate to the driver of the ego vehicle 110 that and possibly how an emergency lane should be formed.

The control unit 111 of the ego vehicle 110 may thus be designed to assign vehicles 110, 120 that are depicted in the surroundings display 200 on the screen 114, deviating from their respective real, lateral position, to a particular lane 101, 102, 103 and to depict them within the display 200 at a standard position (in particular centrally) within the respective displayed lane 201, 202, 203. Exclusively in situations in which the lateral position is particularly relevant, the respective lateral position (in particular the lateral position of the ego symbol 210) may possibly be displayed. This leads to the display 200 being steadied and reflects a logical subdivision of the vehicle surroundings that may be used to structure the display in relation to the driving task.

The lateral position of the ego symbol 210, in cases without particular relevance, may thus be depicted (exclusively) centrally in the displayed ego lane 201. The control unit 111 may be designed to display the deviation of the ego vehicle 110 from the central line 301 of the lane 101 being driven on, possibly only in the following cases (that is to say in the presence of one of the following lane events):

the driver leaves a stipulated region around the central line 301 of the lane 101 being driven on through steering movements, and thus drives considerably off-center in the lane 101;

the assistance function "lane departure warning" outputs a warning;

the assistance function "lane change assistant" carries out an automated lane change;

the assistance function "transverse guidance with active navigation" intentionally deviates in terms of control from the middle of the lane in order to prepare for an expected lane change; and/or the assistance function "emergency lane assistant" intentionally deviates in terms of control from the middle of the lane in order to form an emergency lane.

The symbols 220 for the one or more surrounding vehicles 120 may each be positioned centrally in the respective displayed lane 201, 202, 203, wherein each surrounding vehicle 120 is assigned to a particular lane 101, 102, 103 on the basis of the surroundings data 252 and/or through processing by a driver assistance function. A lane change of another vehicle 120 may in this case be displayed synchronously with a response of the ego vehicle 110 to the lane change. By way of example, an automatically brought-about braking procedure of the ego vehicle 110 may take place in response to a vehicle 120 pulling in in front of the ego vehicle 110 synchronously with the position change of the vehicle 120 in the display 200.

Resultant jumps in the lateral position of a road user 110, 120 may be smoothed by an animated movement of the respective symbol 210, 220 on the display 200.

Figure 4:
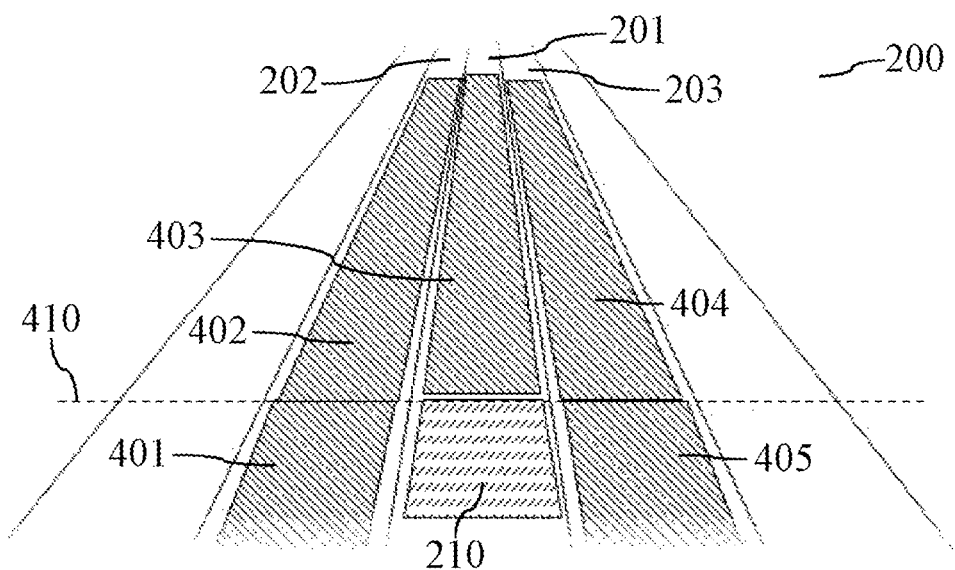
FIG. 4 shows exemplary surroundings sectors around an ego vehicle.

The display of symbols 220 for all acquired road users 120 in the surroundings of the ego vehicle 110 may in particular lead, in a dense traffic situation, to the display or the image 200 on the screen 114 becoming overloaded. The control unit 111 of the ego vehicle 110 may be designed (as illustrated in FIG. 4) to divide the surroundings of the ego vehicle 110 into a limited number of surroundings sectors 401, 402, 403, 404, 405. Examples of surroundings sectors are:

A first surroundings sector 401 to the left and behind the ego vehicle 110 (up to the front line 410 of the ego vehicle 110). The first surroundings sector 401 may for example be arranged completely within the left-hand adjacent lane 102 located directly next to the ego lane 101.

A second surroundings sector 402 to the left and in front of the ego vehicle 110 (starting from the front line 410 of the front of the ego vehicle 110). The second surroundings sector 402 may for example be arranged completely within the left-hand adjacent lane 102 located directly next to the ego lane 101.

A third surroundings sector 403 in front of the ego vehicle 110 (starting from the front line 410 of the front of the ego vehicle 110). The third surroundings sector 403 may for example be arranged completely within the ego lane 101.

A fourth surroundings sector 404 to the right and in front of the ego vehicle 110 (starting from the front line 410 of the front of the ego vehicle 110). The fourth surroundings sector 404 may for example be arranged completely within the right-hand adjacent lane 103 located directly next to the ego lane 101.

A fifth surroundings sector 405 to the right and behind the ego vehicle 110 (up to the front line 410 of the ego vehicle 110). The fifth surroundings sector 405 may for example be arranged completely within the right-hand adjacent lane 103 located directly next to the ego lane 101.

The control unit 111 may be designed, for each surroundings sector 401, 402, 403, 404, 405, to identify at most N, in particular at most one, road user 120 that should be depicted on the screen 200 in relation to the surroundings situation. In this case, the road user 120 having the highest relevance to the ego vehicle 110 and/or having the lowest distance from the ego vehicle 110 may be selected in each surroundings sector 401, 402, 403, 404, 405. Possibly in each case at most only one road user symbol 220 for the respectively selected road user 120 may then be depicted in the image 200 in each individual surroundings sector 401, 402, 403, 404, 405. It is thus efficiently possible to bring about a situation whereby the display or the image 200 on the screen 114 remains limited to the information relevant to the ego vehicle 110. This allows the driver of the ego vehicle 110 to understand a surroundings situation reliably and quickly.

The vehicle surroundings may thus be organized into different sectors 401, 402, 403, 404, 405. The depicted images 200 may furthermore be generated such that at most one vehicle symbol 220 is depicted in a sector 401, 402, 403, 404, 405. Stipulating a limited number (for example five) of sectors 401, 402, 403, 404, 405 that are of particular relevance to the driving task of the ego vehicle 110 ensures a steady display 200. The number of displayed other vehicles 120 may in particular be reduced. Nevertheless, it is still possible to ensure that vehicles 120 that are relevant to the driving task are displayed.

The vehicles 120 in the direct surroundings next to and in front of the ego vehicle 110 are particularly relevant to the driving task. Vehicles 120 on lanes adjacent to adjacent lanes may in this case in particular remain unconsidered. The following sectors may therefore be formed (see FIG. 4):
- at most one vehicle 120 in the left-hand adjacent lane 102 up to the level 410 of the ego vehicle 110;
- at most one vehicle 120 in the left-hand adjacent lane 102 in front of the ego vehicle 110;
- at most one vehicle 120 on the ego lane 101 in front of the ego vehicle 110;
- at most one vehicle 120 in the right-hand adjacent lane 103 in front of the ego vehicle 110; and/or
- at most one vehicle 120 on the right-hand adjacent lane 103 up to the level 410 of the ego vehicle 110.

When selecting which vehicle 102 is displayed in the respective sector 401, 402, 403, 404, 405, one or more of the following rules may be applied:
- In the second, third and fourth sector 402, 403, 404 in front of the ego vehicle 110: It is possible in each case to select the vehicle 120 that is closest to the ego vehicle 110. It is thus possible to select the vehicle 120 that is arranged furthest back in the respective sector 402, 403, 404. These vehicles 120 typically have the relatively highest relevance to the ego vehicle 110 in the respective sector 402, 403, 404.
- In the first and fifth sector 401, 405: It is possible to select the vehicle 120 that is positioned furthest forward in the respective sector 401, 405. These vehicles 120 typically have the greatest relevance to the ego vehicle 110. Selecting these vehicles 120 furthermore allows a graphically clean transition of a vehicle 120 from the first sector 401 to the second sector 402 or from the fifth sector 405 to the third sector 403.

It may be the case, at a sequence of times or over time, that a vehicle 120 arranged in one sector changes to another sector (for example through a lane change or through acceleration or dropping back within the same lane) in which another vehicle is already selected to be displayed prior to the change. For a vehicle 120 that enters a new sector 401, 402, 403, 404, 405 and is selected as relevant vehicle 120, it is potentially possible to depict a symbol 220 directly in the respective sector 401, 402, 403, 404, 405. On the other hand, for the (previously displayed) vehicle 120, it is possible to bring about fading out of the symbol 220 that is stretched over time (for example in a period between 200 ms and 500 ms).

It is thus possible to provide debouncing for the fading in and/or fading out of symbols 220 in a sector 401, 402, 403, 404, 405 in order to avoid disruptive and irritating display effects caused by flickering of symbols 220 on the screen 114, when for example a vehicle 120 repeatedly dips in and out of a particular sector 401, 402, 403, 404, 405 and in the process "replaces" another vehicle 120 that had display priority there. To this end, the symbol 220 for a vehicle 120 to be faded out may be kept on the display 200 even longer for an adjustable (relatively short) period. It is also possible to use soft fading in and/or fading out with a defined transition time.

As already explained, the individual road users 120 in the surroundings of the ego vehicle 110 may each be represented by a road user symbol 220 in the display or the image 200. In this case, the depicted symbol 220 for a road user 120 may depend on the type or the class of the road user 120. For a driver of the ego vehicle 110, the assignment of the individual actual road users 120 to a depicted (abstract) symbol 220 may thus be simplified. The driver of the ego vehicle 110 is thus given the ability to understand a surroundings situation on the depicted image 200 reliably and quickly.

The control unit 111 of the ego vehicle 110 may be designed to determine one class from a plurality of predefined classes for each road user 120 to be depicted on the image 200 on the basis of the surroundings data and/or on the basis of the surroundings model. The plurality of predefined classes may for example comprise a class for automobiles, a class for trucks and a class for motorcycles. The control unit 111 may furthermore be designed to depict an (abstract) symbol 220 dependent on the class of the respective road user 120 on the image 200.

The symbol 220 for a road user 120 may be at least partially independent of the actual dimensions of the road user 120. A respective standard symbol 220 with standard dimensions may in particular be used for automobiles and/or motorcycles. On the other hand, the length 302 of the symbol 220 for a truck may be adapted to the actual and/or to the estimated length of the truck.

In the course of operating the ego vehicle 110, it may be the case that the classification of a road user 120 changes over time. For example, it may be the case that a road user 120 is classified initially as an automobile at a first time on the basis of the surroundings data 252. The road user 120 may then possibly be classified as a truck at a subsequent second time on the basis of the surroundings data 252. The classification of a road user 120 may thus possibly be unstable.

In order nevertheless to allow a temporally stable output 200, a change of the depicted symbol 220 for a road user 120 may possibly be performed only
- when the new class has been ascertained with a relatively high level of confidence; and/or
- when the new class has been ascertained in a stable manner for a minimum duration.

Frequent changes to the symbol 220 depicted for a road user 120 are thus able to be avoided, such that it is possible to avoid confusing the driver of the ego vehicle 100 through a regularly changing image output 200 and such that the perceived depiction quality is increased.

The vehicles 120 depicted in the surroundings display 200 may thus be classified into a limited number (in particular three) of classes: for example motorcycle, automobile and truck. It should be ensured, within the display 200, that the depiction of the classification of a vehicle 120 does not change excessively often. A user study has shown for example that an occasional incorrect display of the class of a vehicle 120 is perceived by drivers as being less disruptive and/or irritating than a relatively frequent change of the depicted class.

To further stabilize the displayed class for a road user 120, an initial starting and/or standard class may optionally be used (for example automobile), this possibly being kept over time when no other temporally stable class is able to be ascertained for the road user 120. In particular for the initial identification of the class of a road user 120 in relation to classification of a few reliable spatial angles (for example behind the vehicle), it is possible to use a standard classification and/or stricter or more stringent transition conditions for a transition to another class may be defined.

The transition of a road user 120 to another class may be controlled by a state machine. A transition for a vehicle 120 from an automobile to a truck or motorcycle may possibly take place only when sufficiently reliable surroundings data 252 are available for the vehicle 120;

the vehicle 120 is located within the field of view of one or more sensors 106 for a high-quality width acquisition;

the width of the vehicle 120 is above a threshold value (for trucks) or (optionally) below a threshold value (for motorcycles); and the above conditions are present for more than a minimum duration (for example between 1 second and 3 seconds).

The transition back to an automobile may possibly take place under the same transition conditions, but with a reverse width threshold value check. As an alternative or in addition, the state machine may be designed such that no further change to the classification of a road user 120 takes place when sufficiently reliable surroundings data 252 are available for the road user 120; and/or when the classification has been maintained for more than a minimum holding time (which may possibly differ from the abovementioned minimum duration).

The symbols 220 in the display 200 are preferably depicted such that the symbols 220 do not overlap. This makes it possible to improve the legibility of the display 200 and the ability to compare with the real traffic situation. An overlap between road users 120 in the display 200 may in particular occur in the longitudinal direction when graphical depictions of road users 220 in the display 200 are larger (longer) than in the real traffic situation. In the case of dense traffic, the representatives 220 however do not overlap the real vehicles 120.

One example of using symbols 220 with fixed dimensions (independent of the dimensions of the real vehicle) does not take this circumstance into consideration, even if an organization into classes (for example truck, automobile, motorcycle) is already depicted.

A static length of the graphical representative or symbol 220 may be selected for an automobile and/or a motorcycle, since these vehicles 120 typically have a relatively low length variance. However, the length 302 may optionally also be dynamically adapted for an automobile and/or a motorcycle (on the basis of length data in relation to the length of the respective road user 120). The length variance is typically relatively large in the case of trucks. For instance, the length 302 of the symbol 220 for a truck may preferably be adapted to the estimated length of the truck. A graphical representative or a symbol 220 that is able to increase or reduce in terms of length may in particular be used for trucks. In this case, the control unit 111 may (optionally) be designed to permit only increases in length and not to permit reductions in length. The display 200 is thus able to be made more stable. Overlaps on the display 200 are thus furthermore able to be reliably avoided.

It may be the case, due to animations of the symbols 210, 220 in the display 200, due to incorrectly interpreted sensor information that leads to incorrect positioning of the symbols 210, 220 or due to other effects, that the symbol 220 of a road user 120 in the image 200 collides with the ego symbol 210. Such a purely graphical collision between the symbols 210, 220 may in particular also occur when the ego vehicle 110 and the road user 120 do not collide with one another in reality. Symbols 220 very rapidly approaching the depicted ego symbol 210 on its ego lane 201 furthermore lead to a perceived collision, even when they are assigned to another lane 202, 203 (shortly before the graphical collision) or discarded by the surroundings model. This may for example, in extreme cases, be the case with parked vehicles 120 that the ego vehicle 110 approaches on a narrow residential street and swerves around shortly beforehand. Both a graphical and in general a perceived collision in the depicted image 200 may be perceived as irritating by the driver of the ego vehicle 110.

Figure 5:
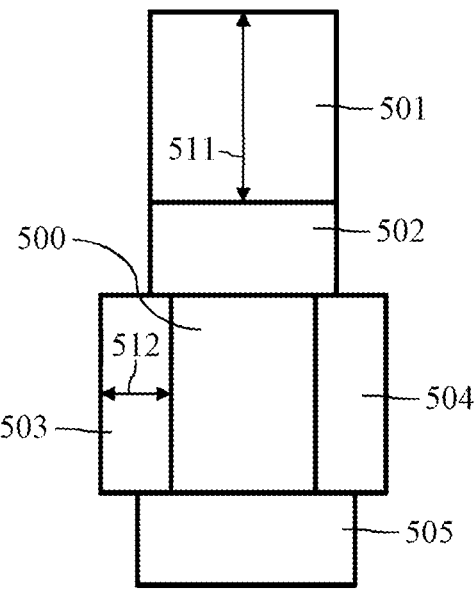
FIG. 5 shows exemplary boundary areas of an ego vehicle.

As illustrated in FIG. 5, one or more boundary areas 501, 502, 503, 504, 505 may be defined in the surroundings of the ego region 500 of the ego vehicle 110 and/or the ego symbol 210 and include for example the ego region 500. The control unit 111 may be designed to identify that the symbol 220 of a road user 120 is penetrating into a boundary area 501, 502, 503, 504, 505 of the ego symbol 210. In response thereto, the symbol 220 of the road user 120 may be at least partially faded out (for example made transparent in order to make the background visible) in order to avoid a visual or perceived collision with the ego symbol 210. The degree of fading out of the symbol 220 may in this case depend on the penetration depth of the symbol 220 into the boundary area 501, 502, 503, 504, 505. The fading out may thus be performed at different speeds or at different distances from the ego symbol 210, depending on the distance from the road user symbol 120 and/or depending on the relative speed between the other road user 120 and the ego vehicle 110.

A road user symbol 220 is preferably depicted in full until reaching a boundary area 501, 502, 503, 504, 505. The road user symbol 220 is (at least partially) faded out preferably only when the road user symbol 220 enters a boundary area 501, 502, 503, 504, 505.

The size (in particular the length 511 and/or the width 512) of the individual boundary areas 501, 502, 503, 504, 505 may depend on the relative speed between the ego vehicle 110 and the other road user 120. It is thus possible to reliably avoid virtual collisions at different relative speeds.

Due to a possible deviation between the real size of a road user 120 and a graphical size of the corresponding symbol 220 and/or due to graphical animations for changing the position of the symbol 220, a possible collision between symbols 210, 220 typically cannot take place on the basis of the position data of the ego vehicle 110 and/or the road user 120. On the contrary, the fading out logic described in this document primarily and/or exclusively acts directly on the graphical symbols 210, 220 and on the graphical level. It is thus possible to identify, (possibly solely) on the basis of the image data 260 for an image 200 to be depicted, that a symbol 220 is penetrating into a boundary area 501, 502, 503, 504, 505 of another symbol 210.

As an alternative or in addition to defining boundary areas 501, 502, 503, 504, 505 for the ego symbol 210, boundary areas 501, 502, 503, 504, 505 around the region 500 of the respective road user symbol 220 may be defined for each road user symbol 220. It is then possible in each case to check whether the ego symbol 110 and/or another road user symbol 220 is penetrating into the boundary area 501, 502, 503, 504, 505 of the respective road user symbol 220.

Examples of boundary areas are: a first boundary area 501 in front of the symbol 210, 220. Since relatively high relative speeds and resultant relatively severe virtual longitudinal collisions are possible in the longitudinal direction, the second boundary area 502 mentioned below may be preceded by a first boundary area 501 in which soft and/or gradual fading out of a penetrating symbol 220 takes place. The deeper the symbol 220 penetrates into the first boundary area 501, the more the symbol 220 is faded out. By way of example, 73% penetration depth may lead to 73% transparency of the symbol 220. The length 511 of the first boundary area 501 may for example be determined from two parameters using a linear interpolation or extrapolation, wherein the two parameters are the length of the first boundary area 501 at a relative speed of 0 km/h, respectively 100 km/h.

As soon as the symbol 220 (after passing through the first boundary area 501) makes graphical contact with the second boundary area 502, the symbol 220 is directly faded out. The length of the second boundary area 502 may possibly be parameterized in the same way as the first boundary area 501 via two grid points.

The lateral third and fourth boundary area 503, 504 may, in the same way as the first boundary area 501, lead to gradual fading out of a penetrating symbol 220. In this case, the width 512 of the respective boundary area 503, 504 may be parameterized via two grid points. The width 512 is typically relatively small in order to allow different depictions of the transverse situation or the lateral position of the ego vehicle 110 and/or of another road user 120 within a displayed lane 201, 202, 203.

The fifth boundary area 505 located behind a symbol 210, 220 may lead to a fixed transparency of the penetrating symbol 220 (for example 50% transparency).

The size 511, 512 of the individual boundary areas 501, 502, 503, 504, 505, the degree of transparency and/or the use of hard or soft fading out may be adapted depending on the present traffic situation (for example on the density of the traffic in the surroundings of the ego vehicle 110). The quality of the depiction of a surroundings situation is thus able to be further improved.

The different boundary areas 501, 502, 503, 504, 505 may possibly at least partially overlap. The transparency of a symbol 220 in the area of overlap between two boundary areas may then be ascertained by way of a maximum selection in relation to the transparency. The quality of the depiction of a surroundings section is thus able to be further improved.

In order to avoid possible oblique (virtual) collisions, the one or more front boundary areas 501, 502 may be wider than the region 500 for the symbol 210, 220.

The symbol 220 of a vehicle 120 that is marked as control target for a driving function 256 of the ego vehicle 110 may be excluded from the fading out logic described in this document (possibly also only for one or more defined boundary areas). Correspondingly, the symbol 220 for a vehicle 120 that is relevant to a driving function 256 (for example a vehicle pulling in, a vehicle pulling out, an overtaking vehicle) may be excluded from the fading out logic. The quality of the depiction of a surroundings situation is thus able to be further improved.

The sizes of the one or more boundary areas 501, 502, 503, 504, 505 may be adapted dynamically to the respectively displayed ego symbol 210 for the ego vehicle 110. It is thus possible to take into consideration ego vehicles 110 of different sizes in an efficient manner.

The size 511, 512 of a boundary area 501, 502, 503, 504, 505 may be adapted to the relative speed such that the time taken by a symbol 220 to pass through a boundary area is independent of the relative speed.

As explained at the outset, the output unit 258 of the ego vehicle 110 may ascertain a corresponding sequence of images 200 in relation to the traffic situation in the surroundings of the ego vehicle 110 at a sequence of times. Each image 200 in this case receives an associated uniform timestamp that indicates the time (in relation to the on-board power system time 253 of the ego vehicle 110) of the information depicted in the image 200. The output unit 258 may be designed, prior to outputting an image 200, to compare the timestamp of the image 200 with the current on-board power system time 253. If it is identified that the timestamp of the image 200 is more than a maximum permissible latency time ahead of the current on-board power system time 253, then the outputting of the image 200 on the screen 114 may be suppressed. It is then possible in particular to initiate a situation whereby no further image 200 is output on the screen 114 for as long as the maximum permissible latency time is not dropped back below. It is thus possible to avoid outputting out-of-date information on the screen 114 and associated irritation of the driver of the ego vehicle 110 in a reliable and efficient manner.

The control unit 111 of the vehicle 110 may thus be designed (possibly using the display unit 258) to perform temporal monitoring between the sensor system 112 and the display surface 114 in order to measure the temporal propagation time between the arrival of a sensor signal 252 to the display in the instrument cluster 114 of the ego vehicle 110. If the measured propagation time exceeds a maximum permissible value, then the surroundings display 200 on the screen 114 may be deactivated.

To this end, all of the sensor data 252 during the sensor fusion with the current on-board power system time 253 may be provided in the form of a timestamp, wherein the timestamp is forwarded in unchanged form through all processing layers between sensor fusion up to display. The on-board power system time 253 may be distributed by way of a time synchronization protocol (for example PTP (Precision Time Protocol), DMCS, and/or IEEE802.1AS) from a time master 251 or the like to the one or more control devices 254, 258 involved for the sensor system processing and for the display surface.

Prior to outputting a display 200, the signal timestamp of the display 220 is compared with the currently present on-board power system time 253 and the active surroundings display 200 on the screen 114 is deactivated in the event of the permitted latency (for example 1 second) being exceeded. The latency monitoring system may be designed to note the last arrived timestamp and to cyclically compare the timestamp with the on-board power system time 253. It is thus possible to reliably identify complete failure of the sensor signals 252 and to deactivate the output of images 200 in response thereto.

In order to avoid flickering of the display of the image 200 on the screen 114 (in the event of recurring activation and deactivation of the output), the reactivation of the output following a deactivation may require a minimum stability time (for example 2 seconds) in which the image signal 260 is provided again reliably without a latency infringement. Images 200 may then be output again only after the minimum stability time has elapsed.

The failure of a sensor 112 without following degradation of the sensor fusion typically does not lead to deactivation of the surroundings display 200, since the fusion provides the timestamp in a normal manner in the event of a partial degradation. If on the other hand a sensor failure leads to degradation of the sensor fusion, the timestamp in the output signals 255 may be set to invalid, which leads to deactivation of the surroundings display 200. In the event of failure of the entire sensor fusion, the surroundings display 200 is typically deactivated, since no new timestamps are received in the latency monitoring system. If an increased bus load on a bus of the ego vehicle 110 leads to an increase in system latency, such that signals arrive late to the latency monitoring system, then this may lead to deactivation of the surroundings display 200 depending on the bus load.

FIGS. 6a to 6e show flowcharts of exemplary methods for depicting information in relation to a traffic situation in the surroundings of an ego vehicle 110. The aspects and/or features described in the individual methods 600, 610, 620, 630, 640 may be combined with one another as desired.

Figure 6A:
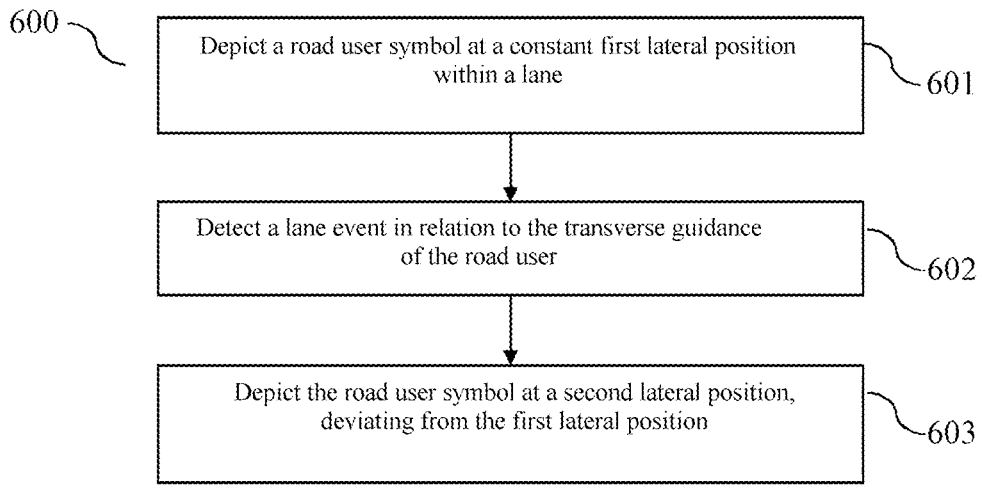
FIG. 6a shows a flowchart of an exemplary method for positioning a road user symbol within a lane.

FIG. 6a shows a flowchart of an exemplary method 600 for depicting a traffic situation on a screen 114 of an ego vehicle 110. The method 600 may be carried out by a control unit 111 of the ego vehicle 110. The ego vehicle 110 is driving on a road 100 with one or more lanes 101, 102, 103. The lanes 101, 102, 103 of the road 100 are referred to as "actual lanes" in order to distinguish them from lanes 201, 202, 203 that are displayed on the screen 114.

The method 600 comprises depicting 601 a road user symbol 210, 220 for a road user 110, 120 of the traffic situation, who is driving in an actual lane 101, 102, 103, at a constant first lateral position within a lane 201, 202, 203 displayed on the screen 114. In other words, the road user symbol 210, 220 may be depicted in a fixed first lateral position at a sequence of times, even when the road user 110, 120 possibly changes lateral position within the actual lane 101, 102, 103. It is thus possible to output a depiction of the traffic situation that is clear and quickly understandable to the driver of the ego vehicle 110.

The method 600 may furthermore comprise detecting 602 a lane event in relation to the fact that the road user 110, 120 will, could or should depart the actual lane 201, 202, 203. The lane event may for example be detected on the basis of sensor data from one or more sensors of the ego vehicle 110.

The method 600 may furthermore comprise, in response to detecting 602 a lane event, depicting 603 the road user symbol 210, 220 at a second lateral position, deviating from the first lateral position, within the displayed lane 201, 202, 203. In this case, the second lateral position may be located at an edge of the displayed lane 201, 202, 203.

The method 600 may for example bring about the effect whereby a road user symbol 210, 220 (in particular the ego symbol 210 for the ego vehicle 110) is most of the time depicted statically at the first lateral position in order to allow a clear and quickly understandable depiction of the traffic situation. A change to a second lateral position may be brought about only in response to a lane event, when required, in order to provide a depiction of the traffic situation that is consistent with the driver's expectations. The comfort and the safety for driving an ego vehicle 110 may thus be increased.

Figure 6B:
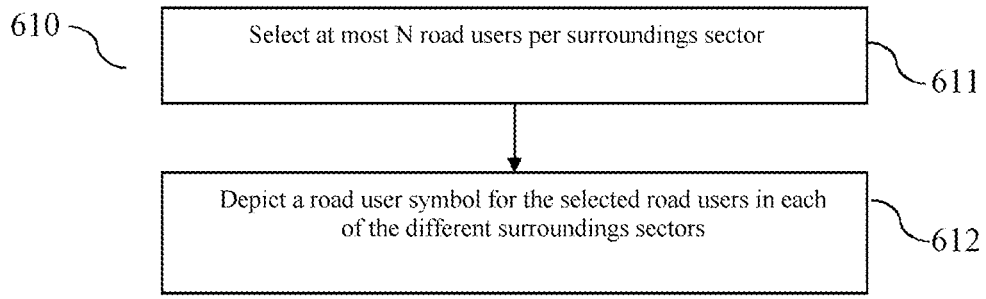
FIG. 6b shows a flowchart of an exemplary method for displaying road user symbols for a road user in the surroundings of an ego vehicle.

FIG. 6b shows a further flowchart of a further method 610 for depicting a traffic situation on a screen 114 of an ego vehicle 110. The method 610 may be carried out by a control unit 111 of the ego vehicle 110.

The method 610 comprises selecting 611 at most N (for example where N=1 or N≤2) road users 120 in each of one or more different surroundings sectors 401, 402, 403, 404, 405 of the surroundings of the ego vehicle 110. The surroundings of the ego vehicle 110 may thus be divided into a limited number of surroundings sectors (for example five sectors or fewer). A limited number N of road users 120 may furthermore be identified in each sector (on the basis of the surroundings data). The N road users 120 may in this case be selected from a number of M road users 120 that are located in the respective surroundings sector 401, 402, 403, 404 405 (wherein M may be different for the different sectors). In this case, M may be greater than, equal to or less than N. If M>N, then it is possible to select a subset of road users 120 that are located in the respective sector, if M=N, then all of the road users 120 located in the respective sector may be selected, and/or if M<N (for example M=0), then possibly only M road users 120 may be selected.

The method 610 furthermore comprises depicting 612, for each of the one or more surroundings sectors 401, 402, 403, 404, 405, in each case up to N road user symbols 220 for the at most N selected road users 120 on the screen 114. The number of road user symbols 220 per surroundings sector that are depicted simultaneously may in particular be limited to N (possibly apart from situations in which a road user changes sector 401, 402, 403, 404, 405). It is thus possible to provide a stable and quickly understandable depiction of a traffic situation in order to increase the comfort and the safety for driving an ego vehicle 110.

Figure 6C:
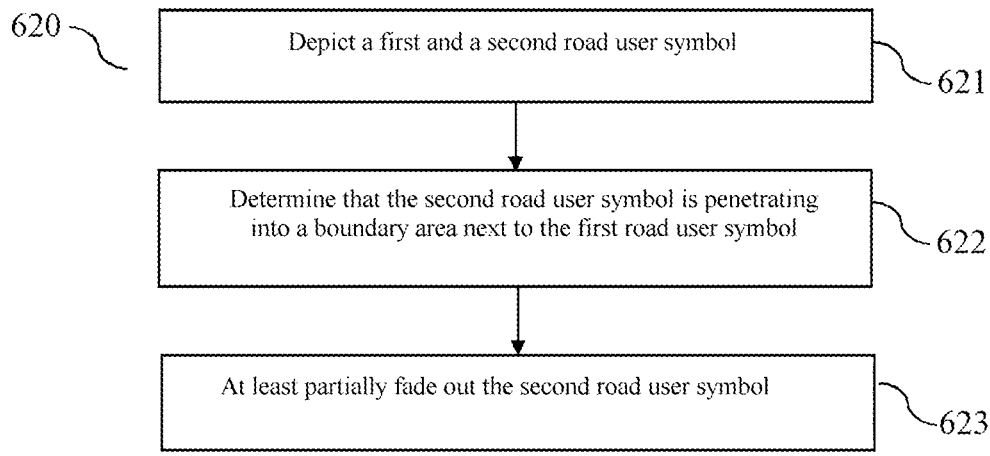
FIG. 6c shows a flowchart of an exemplary method for displaying a road user symbol in a boundary area of an ego vehicle.

FIG. 6c shows a flowchart of a further exemplary method 620 for depicting a traffic situation on a screen 114 of an ego vehicle 110. The method 620 may be carried out by a control unit 111 of the ego vehicle 110.

The method 620 comprises depicting 621 a first road user symbol 210, 220 (for example the ego symbol 210) for a first road user 110, 120 (for example the ego vehicle 110) in a first subregion 500 of the screen 114 and depicting a second road user symbol 210, 220 for a second road user 110, 120 in a second subregion of the screen 114. The positioning of the second subregion in relation to the first subregion may in this case depend on the positioning of the second road user 110, 120 in relation to the first road user 110, 120 (in the actual traffic situation). The actual traffic situation and the arrangement of the first and second road user 110, 120 may thus be reproduced on the screen 114 by a corresponding arrangement of the first and second road user symbol 210, 220.

The method 620 furthermore comprises determining 622, based on a change in the positioning of the second road user 110, 120 in relation to the first road user 110, 120, that the second road user symbol 210, 220 is penetrating into a boundary area 501, 502, 503, 504, 505 for the first subregion 500 of the first road user symbol 210, 220. The boundary area 501, 502, 503, 504, 505 may in this case adjoin the first subregion 500. By way of example, it may be detected, on the basis of the surroundings data, that the second road user 110, 120 and the first road user 110, 120 are moving toward one another. This may be depicted by a corresponding movement of the symbols 210, 220 on the screen 114. Based on the image data 260 for the image 200 to be output in relation to the traffic situation, it is possible to identify (for example by evaluating the position of the individual pixels) that the second road user symbol 210, 220 is penetrating into a boundary area 501, 502, 503, 504, 505 of the first road user symbol 210, 220.

The method 620 furthermore comprises, in response to the second road user symbol 210, 220 penetrating into the boundary area 501, 502, 503, 504, 505, bringing about 623 a situation whereby the second road user symbol 210, 220 is at least partially faded out. In this case, in particular (possibly only) that part of the second road user symbol 210, 220 that penetrates into the boundary area may be at least partially faded out.

By at least partially fading out a symbol 210, 220 on the screen 114 in the event of a potential threat of a graphical or at least perceived collision between symbols 210, 220, it is reliably possible to avoid confusing the driver of the ego vehicle 110. It is thus possible to increase the comfort and the safety for driving an ego vehicle 110.

Figure 6D:
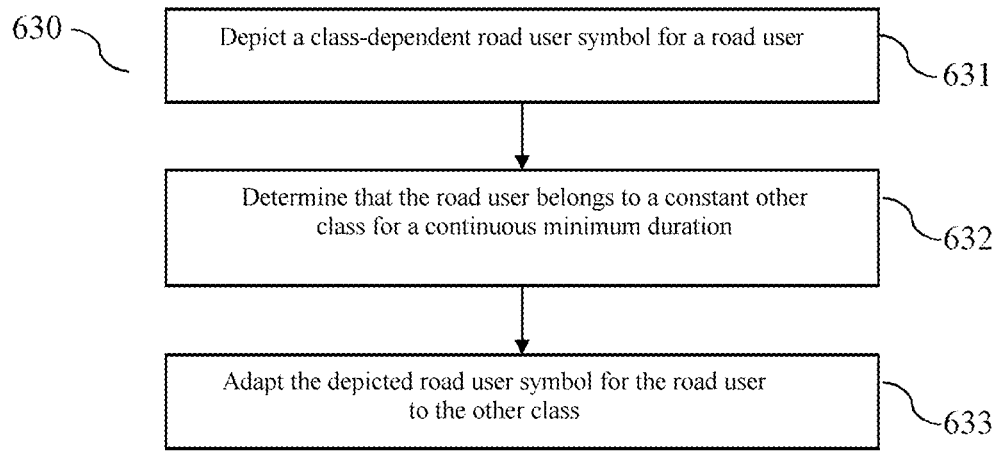
FIG. 6d shows a flowchart of an exemplary method for displaying a class-dependent road user symbol.

FIG. 6*d* shows a flowchart of a further method 630 for depicting a traffic situation on a screen 114 of an ego vehicle 110. The method 630 may be carried out by a control unit 111 of the ego vehicle 110.

The method 630 comprises depicting 631 a road user symbol 220 for a road user 120 involved in the traffic situation on the screen 114, wherein the road user symbol 220 displays a class of the road user 120. The class of the road user 120 may have been ascertained in advance (possibly as a standard class). In this case, different symbols 220 may be used for different classes of road users 120. By way of example, an automobile may be represented on the screen 114 by the symbol of an automobile, a motorcycle may be represented on the screen 114 by the symbol of a motorcycle and/or a truck may be represented on the screen 114 by the symbol of a truck.

The method 630 may furthermore comprise continuously determining 632, over a minimum duration, that the road user 120 has another class. In other words, it is possible to identify or determine (in particular on the basis of the surroundings data), for a minimum duration, that the road user 120 actually belongs to another class. In this case, the class of the road user 120 may be determined possibly repeatedly, in particular periodically. It is furthermore possible to identify that the road user 120 has been repeatedly and permanently assigned to the same or the fixed other class.

The method 630 furthermore comprises, in response to the road user 120 having been assigned permanently to the same other class for a minimum duration, adapting 633 the road user symbol 220 displayed for the road user 120 to the other class. Delaying the changing of the symbol 220 (by the minimum duration) for a new class makes it possible to provide a stable depiction of a traffic situation. Jumps between the symbols 220 for different classes are in particular able to be avoided. It is thus possible to increase the comfort and the safety for driving an ego vehicle 110.

Figure 6E:
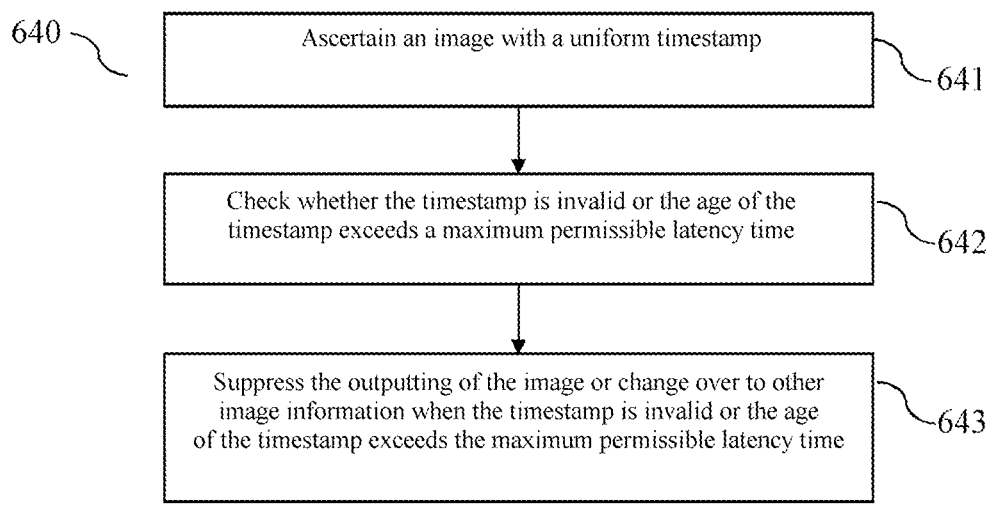
FIG. 6e shows a flowchart of an exemplary method for outputting an image on a screen of a vehicle.

FIG. 6*e* shows a flowchart of a method 640 for depicting an image 200 in relation to a traffic situation on a screen 114 of an ego vehicle 110. The method 640 may be carried out by a control unit 111 of the ego vehicle 110.

The method 640 comprises ascertaining 641, on the basis of the surroundings data from one or more surroundings sensors 112 of the ego vehicle 110, an image 200 in relation to a traffic situation in surroundings of the ego vehicle 110. The image 200 may, as described in this document, comprise symbols 210, 220 for one or more road users 110, 120 of the traffic situation. The image 200 may be ascertained such that the image 200 has a uniform timestamp in relation to the on-board power system time 253 of the ego vehicle 110.

The method 640 furthermore comprises checking 642, in particular at a reference time (which relates to the on-board power system time 253), whether the timestamp is more than a maximum permissible latency time ahead of the reference time and/or whether the timestamp is invalid. The method 640 furthermore comprises suppressing 643 outputting of the image 200 on the screen 114 (and possibly switching to black or changing the screen 114 over to another display) when it has been determined that the timestamp is more than the maximum permissible latency time ahead of the reference time and/or that the timestamp is invalid. It is thus reliably possible to avoid outputting out-of-date surroundings information. It is thus possible to increase the comfort and the safety for driving an ego vehicle 110.

The present invention is not restricted to the disclosed exemplary embodiments. It should in particular be borne in mind that the description and the figures are intended only to illustrate the principle of the proposed methods, devices and systems.

What is claimed is:

1. A control unit for depicting a traffic situation on a screen of an ego vehicle, wherein the control unit is configured:
   to display a first road user symbol for a first road user in a first subregion of the screen and a second road user symbol for a second road user in a second subregion of the screen, wherein a positioning of the second subregion in relation to the first subregion depends on a positioning of the second road user in relation to the first road user;
   to determine that the first road user symbol and the second road user symbol are approaching one another in a particular manner based on a change in the positioning of the second road user in relation to the first road user; and
   in response to the determination that the first road user symbol and the second road user symbol are approaching each other in the particular manner, to at least partially fade out the first road user symbol and/or the second road user symbol.

2. The control unit according to claim 1, wherein the control unit is further configured:
   to determine that the second road user symbol is penetrating into a boundary area for the first subregion of the first road user symbol; and
   in response to the determination that the second road user symbol is penetrating into the boundary area for the first subregion, to at least partially fade out the first road user symbol and/or the second road user symbol.

3. The control unit according to claim 2, wherein the control unit is further configured:
   to ascertain a penetration depth to which the second road user symbol is penetrating into the boundary area for the first subregion; and
   to adapt the degree of fading out of the second road user symbol on the basis of the penetration depth.

4. The control unit according to claim 3, wherein the control unit is further configured:
   to increase a transparency and/or the degree of fading out of the second road user symbol as the penetration depth increases; and/or to reduce the transparency and/or the degree of fading out of the second road user symbol as the penetration depth decreases.

5. The control unit according to claim 4, wherein the control unit is further configured:
to ascertain speed data in relation to a relative speed at which the second road user symbol is moving toward the boundary area for the first subregion, and in relation to a relative speed between the first road user and the second road user; and
to adapt a dimension of the boundary area based on the speed data.

6. The control unit according to claim 5, wherein the control unit is further configured:
to ascertain speed data in relation to a relative speed in the transverse direction and/or in the longitudinal direction of the first road user and/or the second road user; and
to adapt a length of the boundary area based on the speed data in relation to the relative speed in the longitudinal direction; and/or
to adapt a width of the boundary area based on the speed data in relation to the relative speed in the transverse direction.

7. The control unit according to claim 5, wherein the control unit is further configured to increase the dimension of the boundary area as the relative speed increases and/or to reduce the dimension of the boundary area as the relative speed decreases, such that a time in which the second road user symbol passes through the boundary area remains constant.

8. The control unit according to claim 2, wherein the control unit is further configured:
to ascertain a type of the boundary area from a plurality of predefined types; and
to at least partially fade out the second road user symbol based on the type of the boundary area.

9. The control unit according to claim 8, wherein the plurality of predefined types comprises:
a type in which a degree of transparency of a penetrating road user symbol increases as a penetration depth increases;
a type in which the degree of transparency of the penetrating road user symbol is adjusted suddenly to a fixed transparency value as penetration occurs; and/or
a type in which the penetrating road user symbol is faded out suddenly as penetration occurs.

10. The control unit according to claim 2, wherein
the first road user is the ego vehicle;
the first road user symbol is an ego symbol for the ego vehicle; and
the control unit is further configured to depict the ego symbol at a fixed location on the screen; and/or
the first subregion is arranged at a fixed location on the screen.

11. The control unit according to claim 10, wherein the control unit is further configured:
to ascertain size information in relation to a size of the ego vehicle; and
to adapt a size of the boundary area based on the size information.

12. The control unit according to claim 2, wherein the control unit is further configured:
to ascertain density information in relation to a traffic density of the traffic situation in surroundings of the ego vehicle; and
to adapt a size of the boundary area based on the density information.

13. The control unit according to claim 1, wherein the control unit is further configured, for the first road user symbol,
to take into consideration a first boundary area in a direction of travel of the first road user in front of the first road user symbol, in which the second road user symbol is gradually faded out;
to take into consideration a second boundary area between the first boundary area and the first subregion, in which the second road user symbol is abruptly and completely faded out;
to take into consideration a third boundary area in relation to a direction of travel to the left of the first road user symbol, in which the second road user symbol is gradually faded out;
to take into consideration a fourth boundary area in relation to a direction of travel to the right of the first road user symbol, in which the second road user symbol is gradually faded out; and/or
to take into consideration a fifth boundary area in relation to a direction of travel behind the first road user symbol, in which an increased, fixed transparency value of the second road user symbol is adjusted abruptly.

14. The control unit according to claim 1, wherein the control unit is further configured:
to determine that the second road user is an object relevant to a driving function of the ego vehicle; and
in response to the determination that the second road user is the object relevant to the driving function of the ego vehicle, to suppress the at least partial fading out of the second road user symbol, even when the second road user symbol is penetrating into a boundary area of the first subregion.

15. The control unit according to claim 14, wherein the control unit is further configured:
to consider the second road user to be an object relevant to a distance and/or speed controller of the ego vehicle when the second road user serves as a control object for a distance and/or speed controller; and/or
to consider the second road user to be an object relevant to a collision warning system of the ego vehicle when the collision warning system identifies a risk of a possible collision between the ego vehicle and the second road user.

16. The control unit according to claim 1, wherein the control unit is further configured:
to determine, based on a change in the positioning of the second road user in relation to the first road user, whether there is a risk of a collision between the second road user and the first road user; and
to suppress the at least partial fading out of the second road user symbol when it is determined that there is the risk of the collision between the second road user and the first road user; and/or
to bring about the at least partial fading out of the second road user symbol only when it is determined that there is no risk of the collision between the second road user and the first road user.

17. The control unit according to claim 1, wherein the control unit is further configured:
to ascertain a class of the second road user from a plurality of predefined classes; and
to depict the second road user symbol dependent on the class of the second road user on the screen.

18. The control unit according to claim 1, wherein a size of the second road user symbol is at least partially independent of a size of the second road user.

19. A method for depicting a traffic situation on a screen of an ego vehicle, the method comprising:
- depicting a first road user symbol for a first road user in a first subregion of the screen and a second road user symbol for a second road user in a second subregion of the screen;

wherein a positioning of the second subregion in relation to the first subregion depends on a positioning of the second road user in relation to the first road user;
- determining, based on a change in the positioning of the second road user in relation to the first road user, that the second road user symbol and the first road user symbol are approaching one another in a particular manner; and
- in response to the determining, bringing about a situation whereby the first road user symbol and/or the second road user symbol are at least partially faded out.

* * * * *